United States Patent [19]

Tsurutani et al.

[11] Patent Number: 5,440,340
[45] Date of Patent: Aug. 8, 1995

[54] DEVICE FOR MEASURING CHARACTERISTICS OF A COLOR CATHODE RAY TUBE

[75] Inventors: Katsutoshi Tsurutani, Osaka; Shinji Shimizu, Toyokawa; Teruo Ichikawa, Gamagoori; Kazunari Mizuguchi, Toyokawa; Mitsuo Washino, Toyohashi; Yoshiiku Kikukawa, Kishiwada, all of Japan

[73] Assignee: Minolta Co., Ltd., Osaka, Japan

[21] Appl. No.: 77,784

[22] Filed: Jun. 15, 1993

[30] Foreign Application Priority Data

Jun. 19, 1992 [JP] Japan .................................. 4-161313
Jul. 16, 1992 [JP] Japan .................................. 4-189581
Mar. 8, 1993 [JP] Japan .................................. 5-046964

[51] Int. Cl.⁶ ............................................. H04N 17/04
[52] U.S. Cl. .................................. 348/190; 348/191; 348/182
[58] Field of Search ............... 348/189, 182, 190, 184, 348/348, 350, 356, 345; H04N 17/04

[56] References Cited

U.S. PATENT DOCUMENTS

| | | | |
|---|---|---|---|
| 4,833,541 | 5/1989 | Takuma et al. | 348/354 X |
| 4,893,925 | 1/1990 | Sweeney et al. | 348/189 X |
| 5,032,769 | 7/1991 | Kawakami . | |
| 5,216,504 | 6/1993 | Webb et al. | 348/190 |

FOREIGN PATENT DOCUMENTS

| | | |
|---|---|---|
| 4617172 | 12/1968 | Japan . |
| 59107685 | 12/1982 | Japan . |
| 63-116338 | 11/1986 | Japan . |
| 199394 | 10/1987 | Japan . |
| 2107098 | 12/1988 | Japan . |
| 2246590 | 3/1989 | Japan . |

*Primary Examiner*—Victor R. Kostak
*Attorney, Agent, or Firm*—Price, Gess & Ubell

[57] ABSTRACT

A CRT measurement device includes an image pickup device for producing an electrical image signal with respect to a light image displayed on the CRT, an optical system having a movable focusing lens for providing a light image of varied sharpness to the image pickup means in accordance with position of the focusing lens, a sharpness detector for detecting the sharpness of a picked up image based on an electrical image signal each time the focusing lens is moved, a focal position detector for detecting a focal position of the focusing lens providing a most sharpness light image, a driver for driving the focusing lens so as to move to the detected focal position, and calculator means for calculating a characteristic of the color CRT based on the image signal produced when the focusing lens is at the focal position. This device assures automatic and accurate focusing.

14 Claims, 25 Drawing Sheets

RED LINE — rDY

GREEN LINE — gDY

BLUE LINE — bDY

|  | 1 | n/4 | n/2 | 3n/4 | n |
|---|---|---|---|---|---|
| 1 | A(1,1) | A(1,2) | A(1,3) | A(1,4) | |
| m/4 | A(2,1) | A(2,2) | A(2,3) | A(2,4) | |
| m/2 | A(3,1) | A(3,2) | A(3,3) | A(3,4) | |
| 3m/4 | A(4,1) | A(4,2) | A(4,3) | A(4,4) | |
| m | | | | | |

Accd

FIG. 24A

|  j<br>i | 1 | 2 | 3 | 4 |
|---|---|---|---|---|
| 1 | 0 | 0 | 1 | 0 |
| 2 | 1 | 1 | 1 | 1 | Accd
| 3 | 0 | 0 | 1 | 0 |
| 4 | 0 | 0 | 1 | 0 |

FIG. 24B

|  j<br>i | 1 | 2 | 3 | 4 |
|---|---|---|---|---|
| 1 | 0 | 0 | 1 | 0 |
| 2 | 0 | 0 | 1 | 0 |
| 3 | 1 | 1 | 1 | 1 | Accd
| 4 | 0 | 0 | 1 | 0 |

FIG. 24C

|  j<br>i | 1 | 2 | 3 | 4 |
|---|---|---|---|---|
| 1 | 1 | 0 | 0 | 0 |
| 2 | 1 | 1 | 1 | 1 | Accd
| 3 | 1 | 0 | 0 | 0 |
| 4 | 1 | 0 | 0 | 0 |

FIG. 24D

|  j<br>i | 1 | 2 | 3 | 4 |
|---|---|---|---|---|
| 1 | 1 | 1 | 1 | 1 | Accd
| 2 | 0 | 1 | 0 | 0 |
| 3 | 0 | 1 | 0 | 0 |
| 4 | 0 | 1 | 0 | 0 |

DEVICE FOR MEASURING CHARACTERISTICS OF A COLOR CATHODE RAY TUBE

BACKGROUND OF THE INVENTION AND RELATED ART STATEMENT

This invention relates to a device for measuring various characteristics of a color cathode ray tube (hereinafter referred to as color CRT) by picking up an image displayed on a faceplate of a color CRT.

The color CRT has a faceplate whose inner surface is covered with regularly arranged deposits of red, green and blue phosphor materials that emit light to form a color image when hit by the electron beams for the respective colors according to primary color video signals. In a color CRT production line, various characteristics of the color CRT, e.g., misconvergence, is measured to obtain desired performances of the color CRT. Specifically, a test pattern is displayed on the CRT faceplate and an image signal is obtained by picking up an image of the displayed test pattern to measure a characteristic of the CRT.

A conventional measurement device includes a measuring main body and image pickup means, and picks up an image of a test pattern displayed on the CRT by the image pickup means. The image pickup is carried out by the following steps, for example. A head of the image pickup means is held in contact with a selected pickup region of the CRT faceplate. A focusing ring is manually rotated so that the lens of the image pickup means focuses on the target image displayed on the inner surface of the CRT faceplate while observing an image displayed on a monitor screen. After being focused, the image pickup means picks up the image of the test pattern for measurement.

The conventional measurement device requires the manual focus adjustment of the image pickup means, involving complicated image pickup operations and long measurement time. Also, the focusing state is checked by observing an image displayed on the monitor screen with operator's eyes. Consequently, the accuracy of focus adjustment is not constant, resulting in accumulated errors in repeated measurements.

There have been proposed measurement devices provided with an autofocus system to make the focusing of the image pickup means automatic. For example, there has been proposed a measurement device provided with an autofocus system in the fashion of the trigonometrical range measuring in which: a light beam is projected upon an object from an emitter and a reflected light is received by an optical sensor apart a reference length from the emitter; the distance to the object is calculated based on the received position; and the lens is driven in accordance with a calculated distance. Also, there has been proposed a measurement device provided with an autofocus system in the fashion of the phase difference detection in which: object light passed through an objective lens is separated into two focused images by two separator lenses; a phase difference between the two focused images is detected; and the objective lens is driven so as to eliminate the phase difference.

However, in the measurement device with the trigonometrical range measuring type of autofocus system, the light beam reflects at an outer surface of the faceplate. Consequently, the lens is focused on the outer surface of the faceplate, not exactly focused on the inner surface of the faceplate bearing the test pattern.

Also, in the measurement device with the phase difference detection type of autofocus system, it is practically impossible to detect a phase difference because of the fact that: the test pattern consists of fixedly repeated images; the phase difference cannot consequently be detected.

In measurement devices provided with an autofocus system, further, it is critical what portion of the pickup region of the image pickup means is focused on. It is usual practice to focus the image pickup means on a center of the pickup region. In this center focusing, however, if an image at an end portion of the pickup region is selected for measurement, the selected image will be out of focus, and provide a wrong measurement. This problem is keen in measuring a misconvergence of a CRT having a curved faceplate because there is a considerable difference between the distance to an image at a center portion of the pickup region and that to an image at and portion of the pickup region.

Further, in the focus adjustment based on light from an image on the faceplate of a CRT, there is a likelihood that only an upper or lower half of a target image is picked up for an improper pickup timing. In such a case, the autofocusing will be impossible because of insufficient light.

As an example of misconvergence measurement device, Japanese Unexamined Patent Publication No. 2-174492 discloses a misconvergence measurement device which provides a white crosshatch test pattern on the faceplate of a color CRT, picks up an image having an intersection portion of the white crosshatch test pattern to produce image signals for red, green, and blue images of the picked up image respectively, and measures misconvergences in horizontal and vertical directions based on the red, green and blue image signals.

When using such a white crosshatch test pattern, an image pickup means of the misconvergence measurement device is required to be positioned so that the pickup region of the pickup means covers an intersection portion of the crosshatch test pattern and both horizontal and vertical lines. In conventional measurement devices, such positioning of image pickup means is carried out by hands of the operator as well as focusing of image pickup means, which consequently makes it difficult to accomplish easy and speedy misconvergence measurement.

Specifically, when an intersection portion of the crosshatch pattern is located at an end portion of the pickup region, proper misconvergence measurement cannot be carried out and the image pickup means is accordingly required to be moved so that the intersection portion comes into a center of the pickup region. This is a cumbersome operation.

Also, it is difficult to visually check on a monitor screen if the image pickup means is located at an appropriate position. Accordingly, this will make difficult prompt positioning of the image pickup means. In the case of measuring misconvergences at a plurality of points on the faceplate, particularly, a considerably longer time is consumed for misconvergence adjustment. This will lower the productivity of color CRTs.

For measurements other than misconvergence measurement, it i s necessary to move the image pickup means so that an image of the test pattern comes into a specified position of the pickup region if not at the specified position. Similarly to the above, this will make the measurement time longer.

It is possible that an intersection portion of the crosshatch pattern is always within the pickup region by reducing the mesh pitch of the crosshatch pattern. This will eliminate the necessity of moving the image pickup means for positioning. In a crosshatch pattern of a reduced mesh pitch, however, there is a likelihood that in misconvergence measurement, a target line cannot be discriminated from adjacent lines.

To accurately measure a characteristic of a color CRT, further, it is necessary to hold the image pickup means in such a position that an optical axis of the lens system of the image pickup means is perpendicular to the faceplate of the CRT, in other words, to hold the image sensing plane of the image pickup means parallel to the CRT faceplate. However, it is very difficult to achieve this positioning because of the curvature of the CRT faceplate. In practice, consequently, it has been unavoidable to pick up a target image in an oblique direction and result in measurement errors.

OBJECTS AND SUMMARY OF THE INVENTION

The present invention overcomes the above-mentioned drawbacks.

It is an object of the invention to provide a measurement device for measuring a characteristic of a CRT which is capable of accurately promptly autofocusing on a target image.

It is another object of the invention to provide a CRT measurement device which can execute autofocusing on any portion within the pickup region of the device.

It is still another object of the invention to provide a CRT measurement device which can assuredly obtain an image signal necessary for autofocusing.

It is yet another object of the invention to provide a CRT measurement device which can execute quick and accurate measurement of CRT characteristics without being moved.

It is still yet another object of the invention to provide a CRT measurement device which can execute measurement accurately and discriminately even when using a small pitched crosshatch test pattern.

It is a further object of the invention to provide a CRT measurement device which can execute accurate measurement even in when an optical axis of the device is not at right angles with the CRT faceplate.

According to the present invention, a device for measuring a characteristic of a color CRT having a display plane comprises image pickup means for producing an electrical image signal with respect to a light image displayed on the display plane; an optical system for introducing a light image from the color CRT to the image pickup means, the optical system having a movable focusing lens for providing a light image of varied sharpness to the image pickup means in accordance with position of the focusing lens; sharpness detector means for detecting the sharpness of a picked up image based on an electrical image signal each time the focusing lens is moved; focal position detector means for detecting a focal position of the focusing lens providing a most sharpness light image; driver means for driving the focusing lens so as to move to the detected focal position; and calculator means for calculating a characteristic of the color CRT based on the image signal produced when the focusing lens is at the focal position.

The calculator means may be means for calculating a misconvergence of the color CRT. The light image on the display plane may be a measurement image having a predetermined pattern figure, such as crosshatch pattern. The sharpness detector means may be means for detecting a high frequency component of the electrical image signal. The image pickup means may include a two-dimensional area sensor.

Also, a device of the present invention comprises image pickup means for picking up a light image on the display plane within a pickup region having a specified area to produce an electrical image signal with respect to the light image, the pickup region consisting of a plurality of subregions for measurement; an optical system having a focusing lens for providing a focused light image from the color CRT to the image pickup means; divider means for dividing the electrical image signal into a plurality of portions corresponding to the plurality of subregions; selector means for selecting an image signal portion corresponding to a particular subregion; controller means for controlling the focusing lens based on the selected image signal portion so as to focus on the particular subregion; and calculator means for calculating a characteristic of the color CRT based on the selected image signal portion produced when the focusing lens is focused on the particular subregion.

The controller may be provided with sharpness detector means for detecting a sharpness of a picked up image based on the electrical image signal each time the focusing lens is moved; focal position detector means for detecting a focal position of the focusing lens providing a most sharpness light image; and driver means for driving the focusing lens so as to move to the detected focal position.

According to the present invention, further, a device for measuring a characteristic of a color CRT producing a light image on a display plane thereof in accordance with a vertical synchronizing signal, the device comprises image pickup means for picking up a light image to produce an electrical image signal with respect to the light image; image pickup controller means responsive to the vertical synchronizing signal for controlling the image pickup means so as to pick up a light image in synchronism with the vertical synchronizing signal; an optical system for providing a focused light image to the image pickup means; optical system controller for controlling the optical system based on the image signal so as to attain a focal state; and calculator means for calculating a characteristic of the color CRT based on the image signal with respect to the focused light image.

Further, a measurement device of the present invention comprises image generator means for generating a light image on the display plane of the color CRT; image pickup means for picking up the light image on the display plane to produce an electrical image signal with respect to the light image; an optical system for providing a focused light image to the image pickup means; discriminator means for discriminating based on the image signal whether the position of the light image on the display plane is appropriate for measurement; controller means responsive to the discriminator means for controlling the image generator means so as to shift the light image on the display plane of the color CRT when the discriminator means discriminates not to be appropriate; and calculator means for calculating a characteristic of the color CRT based on the image signal produced when the light image is on an appropriate position.

The discriminator means may be provided with divider means for dividing the electrical image signal into a plurality of portions corresponding to the plurality of subregions; and position detector means for detecting the position of the light image on the display plane of the color CRT based on the plurality of image signal portions. The image generator means may be made of a generator for generating a light image in the form of a crosshatch pattern; and discriminator means includes a discriminator for discriminating whether an intersection of the crosshatch pattern image is on an appropriate position for measurement. Further, it may be appropriate to provide second discriminator means for discriminating whether the position of a shifted light image is appropriate for measurement; and an optical system controller for controlling the optical system in accordance with the image signal with respect to the shifted light image so as to focus on the shifted light image when the second discriminator means discriminates to be appropriate.

Furthermore, a device of the present invention comprises image generator means for generating a light image on the display plane of the color CRT, the light image being in the form of a crosshatch pattern whose one intersection has a different figure from intersections nearest the one intersection; image pickup means for picking up a portion of the crosshatch pattern light image on the display plane to produce an electrical image signal with respect to the light image portion; and calculator means for calculating a characteristic of the color CRT based on the image signal.

Moreover, a device of the present invention comprises image pickup means for picking up a light image on the display plane of the color CRT to produce an electrical image signal with respect to the light image, the image pickup means having an image sensing plane; calculator means for calculating a characteristic of the color CRT based on the image signal; detector means for detecting an inclination of the image sensing plane relative to the display plane of the color CRT; and corrector means for correcting a result of the calculation of the calculator means based on a detected inclination.

The measurement device of the present invention is provided with the sharpness detector means for detecting the sharpness of a picked up image, the focal position detector means for detecting a focal position of the focusing lens providing a most sharpness light image, and the driver means for driving the focusing lens so as to move to the detected focal position. Accordingly, accurate and rapid autofocusing can be performed.

Also, the measurement device which is provided with the divider for dividing the electrical image signal into a plurality of portions corresponding to the plurality of subregions, and the controller means for controlling the focusing lens based on a selected image signal portion for a particular subregion so as to focus on the particular subregion enables the optical system to be focused on the particular subregion to be measured at all times. Accordingly, the calculation of a characteristic can be executed based on more accurate image signal.

Further, the measurement device provided with the image pickup controller means for controlling the image pickup means so as to pick up a light image in synchronism with the vertical synchronizing signal can assuredly provide an image signal necessary for focusing.

Further, the measurement device provided with the controller means for controlling the image generator means so as to shift the light image on the display plane of the color CRT to an appropriate position makes it possible to automatically accomplish setting of measuring position without moving a measuring probe on the color CRT.

Furthermore, the measurement device which uses a crosshatch pattern having differently-figured intersections assures rapid and accurate selection of measurement spots.

Moreover, the measurement device provided with the corrector means for correcting a result of characteristic calculation taking into consideration an inclination of image sensing plane relative to the display plane of a color CRT can provide more accurate measurement result.

These and other objects, features and advantages of the present invention will become more apparent after having read the following detailed disclosure of preferred embodiments, which are illustrated in drawings.

BRIEF DESCRIPTION OF THE DRAWINGS

FIGS. 24A to 24D are diagrams showing another binary digital representations of crosshatch pattern images within the pickup region;

DETAILED DESCRIPTION OF PREFERRED EMBODIMENTS OF THE INVENTION

Figure 1:
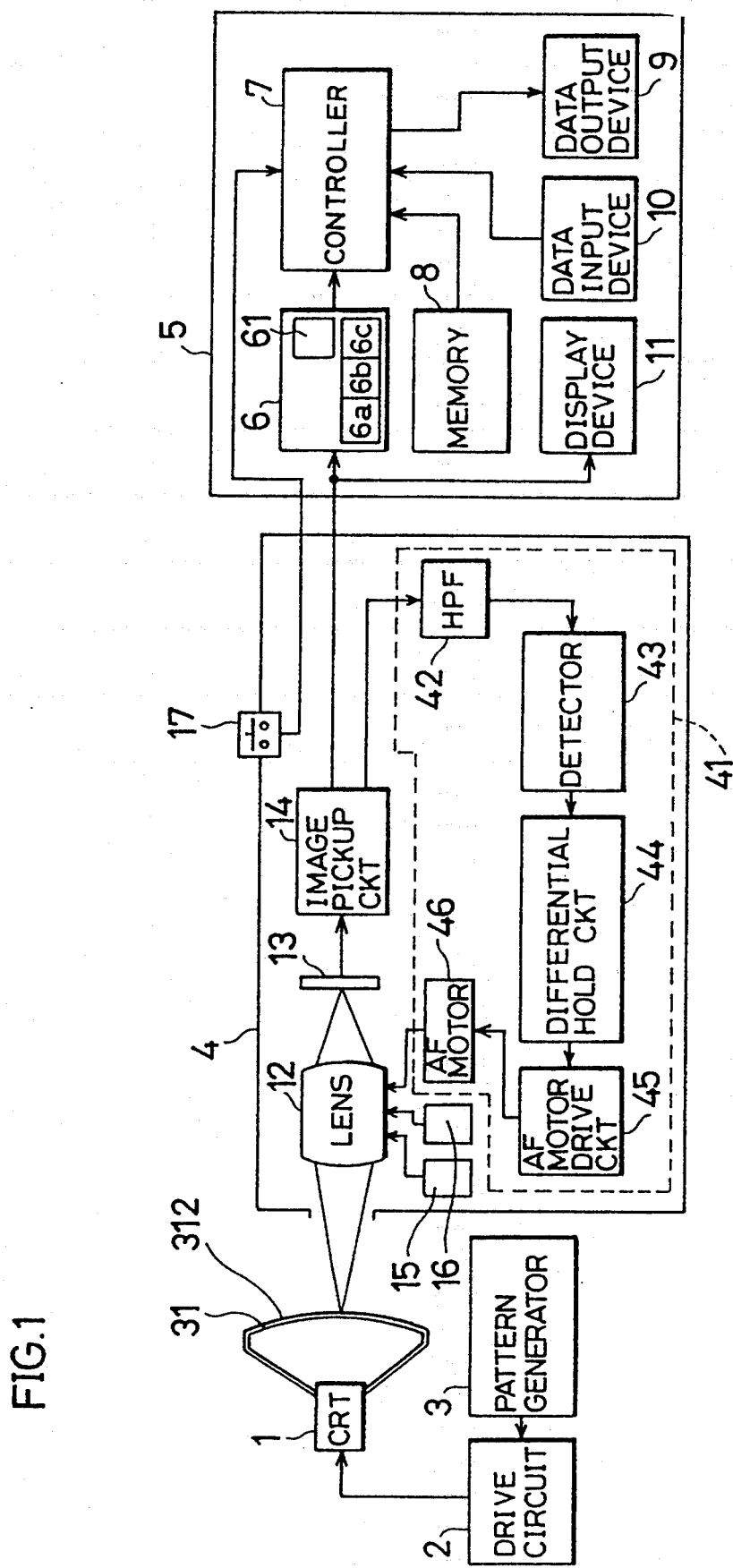
FIG. 1 is a block diagram showing an overall construction of a first CRT measurement device of the present invention.
Figure 3:
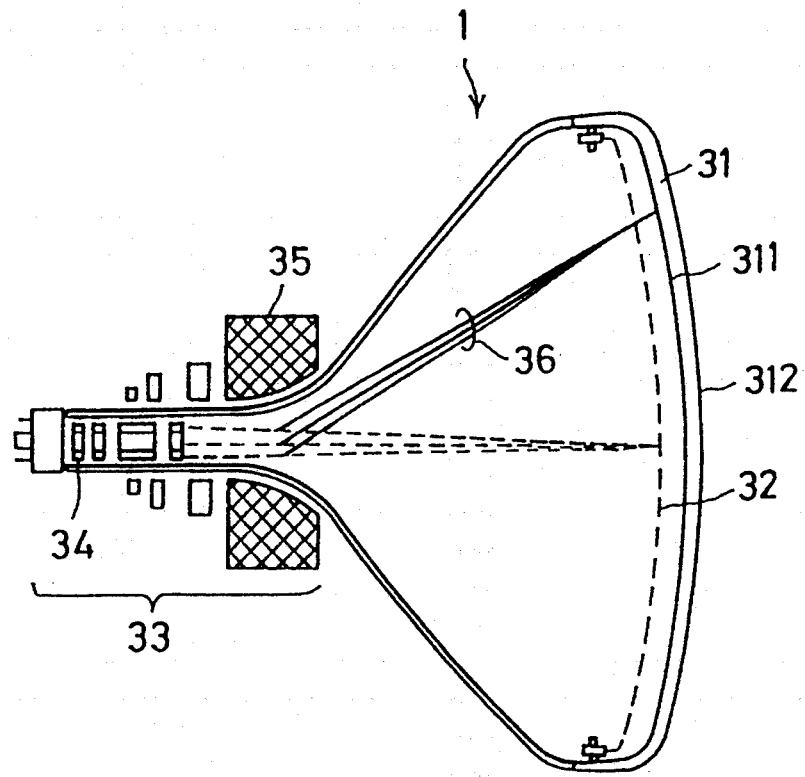
FIG. 3 is a schematic sectional view showing a general construction of a color CRT to be measured by the measurement device.

FIG. 1 is a block diagram showing an overall system of measurement device for measuring a misconvergence of a color CRT. In FIG. 1, indicated at 1 is a color CRT to be measured, indicated at 2 is a drive circuit for controlling drive of the CRT 1, and indicated at 3 is a pattern generator for generating a test pattern for misconvergence measurement, for example, a crosshatch pattern. The CRT 1 is a shadow mask type color CRT mainly consisting of a faceplate 31 on which the test pattern is to be reproduced, a shadow mask 32 having a great number of holes, and an electron gun assembly 33 for producing three electron beams 36, as shown in FIG. 3.

Figure 4:
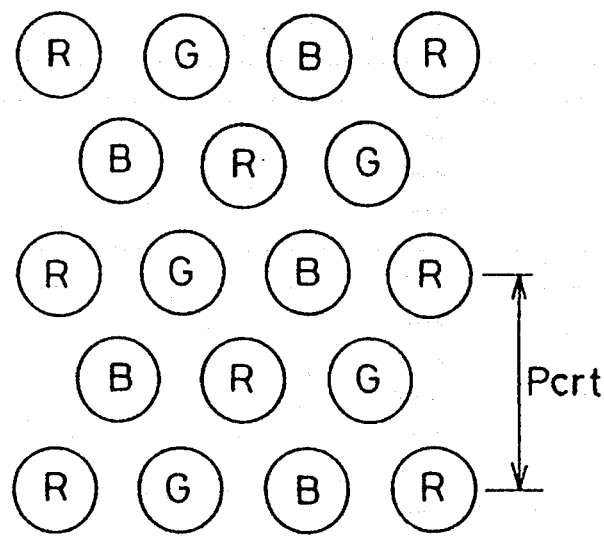
FIG. 4 is a diagram showing an arrangement of phosphor dots of the color CRT.

On an inner surface of the faceplate 31, as shown in FIG. 4, there are regularly arranged red, green and blue phosphor dots to form a phosphor screen 311. The three electron beams 36 emitted from individual electron guns 34 of the electron gun assembly 33 are deflected by a deflection yoke 35 to scan the phosphor screen 311. The individual electron beams 36 are blocked by the shadow mask 32. Only when passing through holes in the shadow mask 32, the individual electron beams 36 reach the phosphor screen 311 to excite their respective phosphor dots to produce a light image of a specified color on the faceplate 31.

The pattern generator 3 generates a test pattern signal for misconvergence measurement, and sends the test pattern signal to the drive circuit 2. The drive circuit 2 drives the electron guns 34 in accordance with the test pattern signal to generate three electron beams 36 which cause in turn phosphor dots on the phosphor screen 311 to emit light to reproduce the test pattern on the faceplate 31.

Referring again to FIG. 1, the misconvergence measurement device is essentially made of an image pickup probe 4 for picking up an image of the test pattern on the faceplate 312 to produce an image signal, and a measuring main body 5 for calculating a misconvergence based on the image signal.

The image pickup probe 4 includes a solid-state image pickup device 13, a lens assembly 12 for focusing light from an image of the test pattern on the image pickup device 13, and an autofocusing mechanism 41 (hereinafter referred to as AF mechanism) to be described later.

Figure 2:
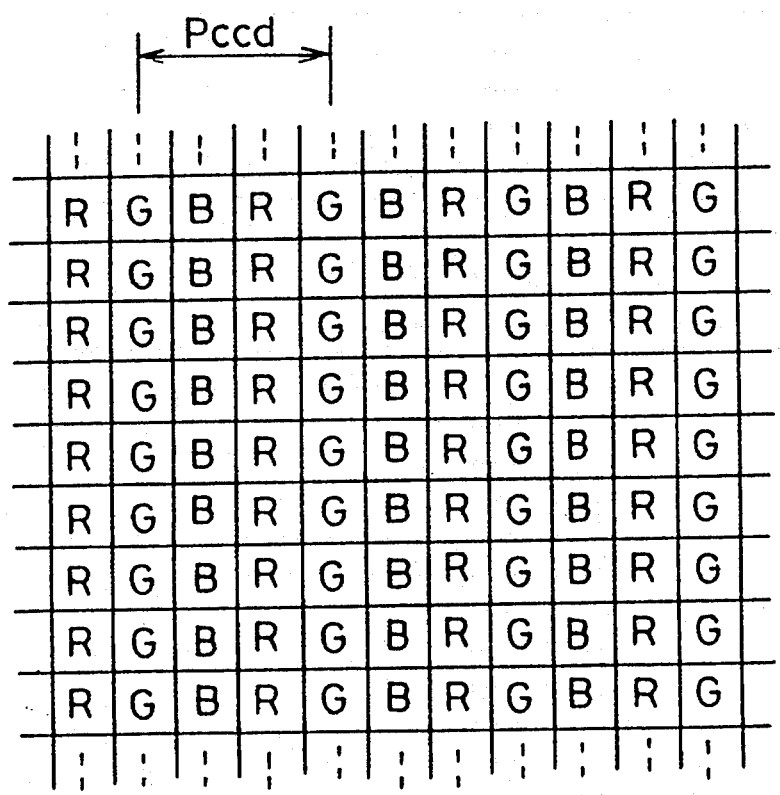
FIG. 2 is a diagram illustrating an arrangement of color filters on a color CCD of the measurement device.

The image pickup device 13 is in the form of a single plate and includes a charge-coupled device (hereinafter referred to as image pickup device) having a number of photoelectric conversion elements (hereinafter referred to as pixels) arranged in a two-dimensional matrix and a color filter sheet provided over the arrangement of photoelectric conversion elements. The color filter sheet has a specified arrangement of red, green, and blue color filters as shown in FIG. 2, each filter being exactly overlaid on each pixel. It is to be noted, however, that MOS-type or other types of solid-state image pickup devices may be also used.

The image pickup device 13 produces and sends an image signal to an image pickup circuit 14 which in turn separates the image signal into red, green, and blue primary color signals. These signals are sent to the measuring main body 5. The image pickup circuit 14 further separates a luminance signal from the image signal and sends it to the AF mechanism 41.

The AF mechanism 41 adopts the so-called hill climbing method, and includes a high-pass filter 42

(hereinafter referred to as HPF), a detector 43, a differential hold circuit 44, an AF motor drive circuit 45, and an AF motor 46 for driving a focusing lens of the lens assembly 12.

The HPF 42 takes out only high-frequency components from the luminous signal from the image pickup circuit 14 and the detector 43 detects these high-frequency components. The detector 43 generates a focusing voltage Vf. The focusing voltage Vf represents the sharpness of the picked up image and has a maximum value when the focusing lens of the lens assembly 12 comes into a focal lens position A as shown in FIG. 5.

The differential hold circuit 44 samples and holds the focusing voltage Vf sent from the detector 43 at a regular interval. The differential hold circuit 44 generates a positive voltage when the focusing voltage Vf increases with time, and a negative voltage when the focusing voltage Vf decreases with time. More specifically, it generates a positive voltage if the rate of change of the focusing voltage Vf with respect to the position of focusing lens is positive, and a negative voltage if the rate of change of the focusing voltage Vf is negative.

Figure 5:
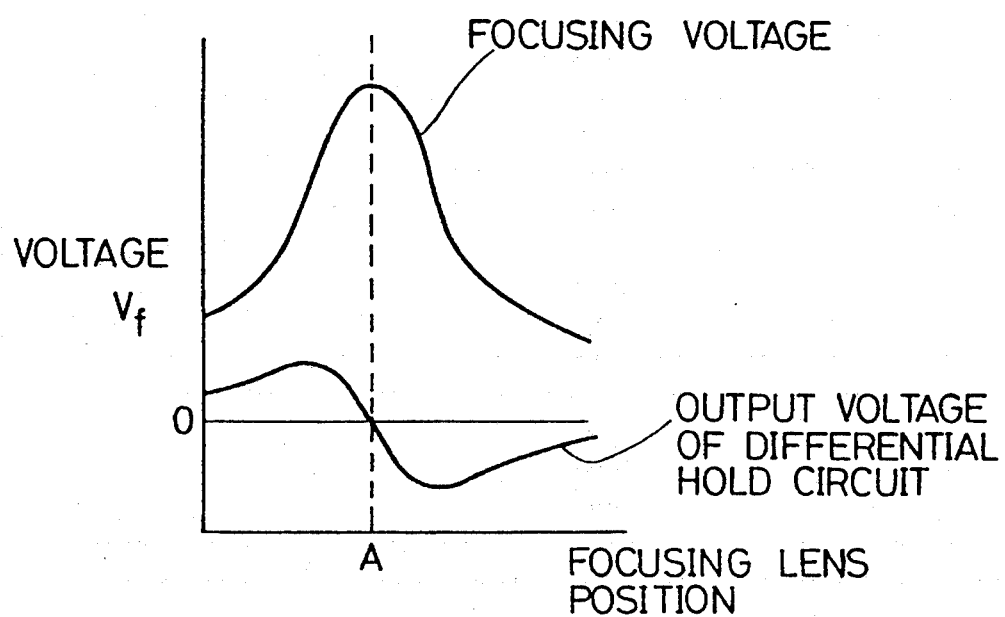
FIG. 5 is a graph showing a relationship between a focusing voltage and a focusing lens position, and a relationship between a differentiated voltage of the focusing voltage and a focusing lens position.

In other words, a positive voltage is generated from the differential hold circuit 44 when the focusing lens is in a position between the origin of the coordinate shown in FIG. 5 and the focusing position A. On the other hand, a negative voltage is generated from the differential hold circuit 44 when the focusing lens is in a position between the focusing position and a further position.

The AF motor drive circuit 45 drives the AF motor 46 according to the focusing voltage Vf from the differential hold circuit 44. Specifically, the AF motor drive circuit 45 causes the AF motor 46 to rotate at a specified speed in a forward direction to move the focusing lens of the lens assembly 12 in a forward direction when the focusing voltage Vf of the differential hold circuit 44 is positive. Contrarily, the AF motor drive circuit 45 causes the AF motor 46 to rotate at a specified speed in a reverse direction to move the focusing lens in a backward direction when the focusing voltage Vf of the differential hold circuit 44 is negative.

Accordingly, in the course from the origin to the focusing position A, the focusing voltage Vf increases and the AF motor 46 makes a forward rotation to move the focusing lens in the forward direction. In the course from the focusing position to the further position, the focusing voltage Vf decreases and the AF motor 46 makes a reverse rotation to move the focusing lens in the backward direction.

The focusing lens is moved in the forward or backward direction in a fine pitch until reaching the focusing position A. In this way, the in-focus state of the lens assembly 12 is accomplished.

As described above, to attain the focusing of the lens assembly 12, a signal representative of the image sharpness is detected and the focusing lens is moved so that the image sharpness signal reaches the maximum value. Accordingly, it can be easily and accurately attained to focus the lens assembly 12 on an image to be picked up for misconvergence.

Further, the image pickup probe 4 is provided with a zooming mechanism for adjusting the magnification of the lens assembly 12 and an aperture changing mechanism for adjusting the diaphragm aperture. The zooming mechanism includes a zooming ring 15. The aperture changing mechanism includes an aperture ring 16. Indicated at 17 is a switch for starting the measurement.

The switch 17 generates a start trigger signal which is sent to the measuring main body 5.

The measuring main body 5 includes an image data memory circuit 6 for storing an image data produced in the image pickup probe 4, a controller 7 for controlling measurement operations while executing calculation of a misconvergence, a memory 8 for storing a program for measurement operations and other various data, an output device 9 for outputting a calculation result, an input device 10 for inputting data necessary for calculation, and a display device 11 for displaying a monitor image.

The image data memory circuit 6 includes an analog-to-digital converter 61 (hereinafter referred to as A/D converter) and three backup memories 6a, 6b and 6c. Respective analog image signals for red, green and blue primary colors are sent from the image pickup probe 4 and then converted into digital image signals (hereinafter referred to as image data). The image data are once stored in the backup memories 6a, 6b and 6c for respective colors.

The controller 7 includes a microprocessor, and controls the operation of measuring according to a control program stored in the memory 8 and calculates a misconvergence based on image data stored in the image data memory circuit 6. The calculated misconvergence is stored in the memory 8 while being sent to the output device 9. The input device 10 is adapted for inputting various data into the controller 7. The input data includes data required for misconvergence calculation, such as phosphor pitch Pcrt of the CRT 1, pixel pitch Pccd of the image pickup device 13, magnification $\beta$.

Next, a misconvergence measurement will be described with reference to FIGS. 6A to 6D.

Figure 6A:
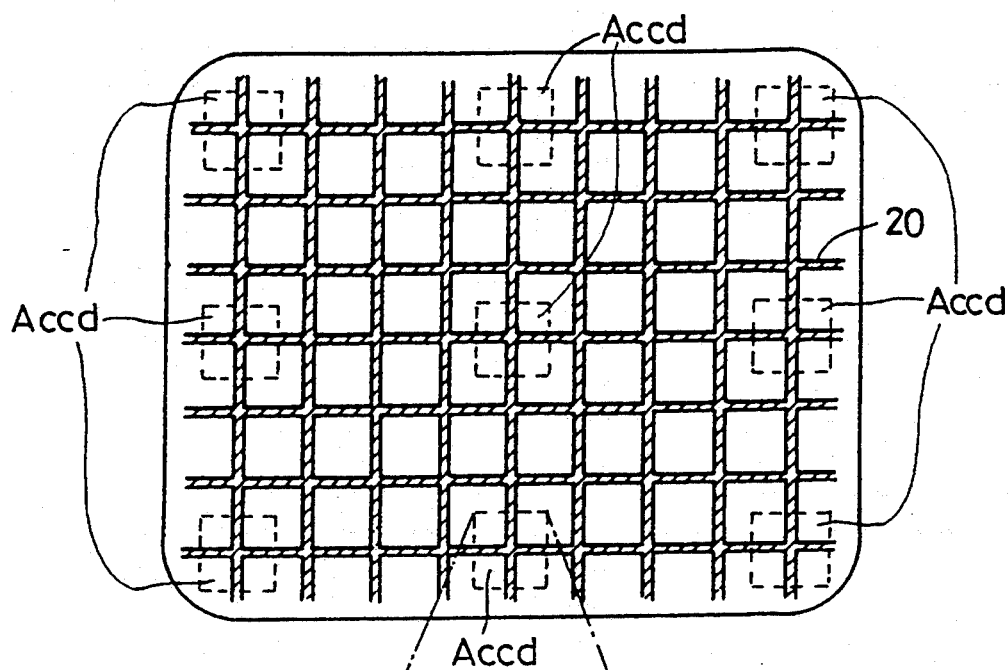
FIG. 6A is a diagram showing an entire image of a test pattern displayed on the color CRT and positions of pickup regions of the measurement device.

FIG. 6A illustrates a crosshatch pattern 20 for misconvergence measurement displayed on a whole image sensing plane on the faceplate 31 of the CRT 1. Indicated at Accd are pickup regions selected for measuring a misconvergence. Each pickup Accd region contains an intersection of horizontal and vertical lines to enable misconvergence measurement in both horizontal and vertical directions.

Figure 6B:
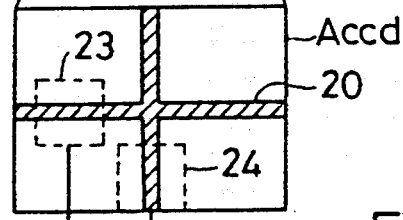
FIG. 6B is a diagram showing an image of the test pattern which is displayed within the pickup region of the measurement device.

FIG. 6B gives an expanded view of an image picked up from one pickup region Accd. The pickup region Aced shown in FIG. 6B contains an image obtained by the image pickup device 13. Indicated at 23 is a measurement spot containing a portion of a horizontal line of the crosshatch pattern 20 and this spot (hereinafter referred to as horizontal line measurement spot) is used for measuring misconvergence in a vertical direction. Similarly, indicated at 24 is a measurement spot containing a portion of a vertical line of the crosshatch pattern 20 and this spot (hereinafter referred to as vertical line measurement spot) is used for measuring misconvergence in a horizontal direction.

Figure 6C:
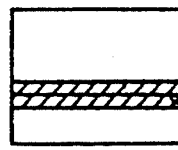
FIG. 6C is a diagram showing individual images of three primary colors in a measurement spot on a horizontal line image within the pickup region.
Figure 6C:
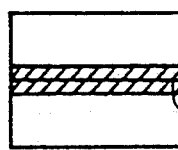
Figure 6C:
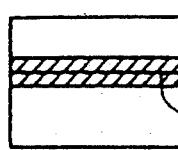

FIG. 6C shows red, green and blue lines separated from the image obtained from the horizontal line measurement spot 23, where lines rDY, gDY and bDY indicate luminous centers of gravity of the red, green and blue lines, respectively. Also, FIG. 6D shows red, green and blue lines separated from the image obtained from the vertical line measurement spot 24, where lines rDX, gDX and bDX indicate luminous centers of gravity of the red, green and blue lines, respectively.

Figure 6D:
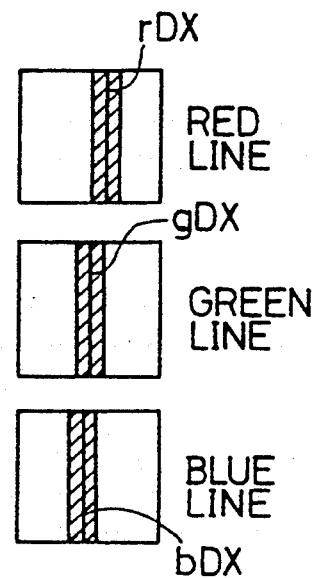
FIG. 6D is a diagram showing individual images of three primary colors in a measurement spot on a vertical line image within the pickup region.

FIGS. 6C and 6D indicate a status of misconvergence. Accordingly, the respective luminous gravity centers of the horizontal lines rDY, gDY and bDY deviate from each other and the respective luminous gravity centers of the vertical lines rDY, gDY and bDY also deviate from each other.

The following is a description of steps of misconvergence measurement.

First, a white crosshatch pattern 20 is generated by the pattern generator 3 and displayed on the faceplate 31 of the CRT 1 via the drive circuit 2 as shown in FIG. 6A.

Figure 7:
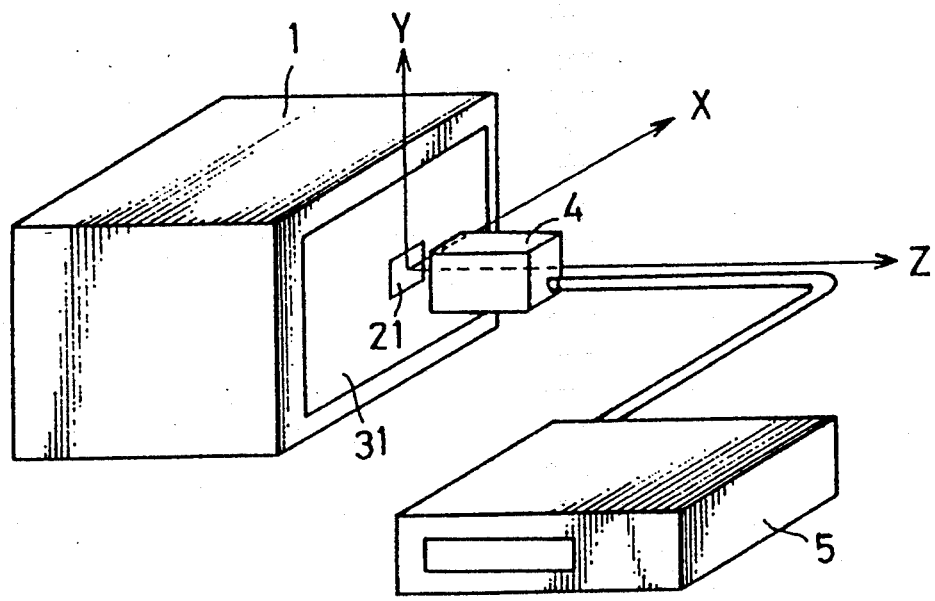
FIG. 7 is a perspective view showing a setup of the measurement device to the color CRT.

Next, the image pickup probe 4 is set on the faceplate 31 at a position corresponding to a pickup region Accd as shown in FIG. 7.

With the pickup region Accd, a coordinate system is provided. An X-axis of the coordinate system is in a horizontal direction while a Y-axis is in a vertical direction, as shown in FIG. 7.

After setting the image pickup probe 4 in the position, measurement is carried out of a tilting angle $\theta$ of the image sensing plane of the image pickup device 13 with respect to a plane of the faceplate 31 including the pickup region Aced.

The misconvergence is, as described above, measured with respect to the horizontal direction (X-axis) and the vertical direction (Y-axis), respectively. Accordingly, the tilting angles $\theta$X and $\theta$y are measured in both horizontal and vertical directions.

Figure 8A:
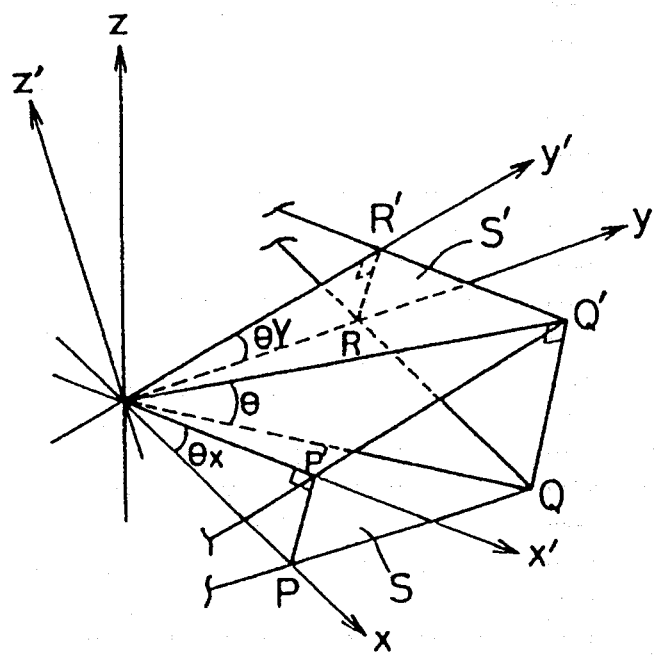
FIGS. 8A and 8B are diagrams illustrating a tilting angle of an image pickup probe of the measurement device in relative to the color CRT and a coordinate system provided on an image sensing plane of an image pickup device of the image pickup probe.
Figure 8B:
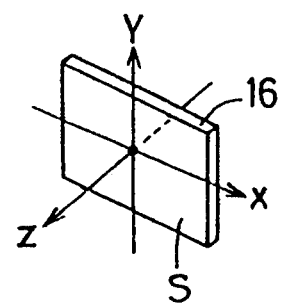

The tilting angle $\theta$ will be more specifically described with respect to FIGS. 8A and 8B.

In FIG. 8A, a plane S containing points O, P, Q and R is the image sensing plane of the image pickup device 13 while a plane S' containing points O', P', Q' and R' is an display plane on the faceplate 31 containing the pickup region Aced. As shown in FIG. 8B, a rectangular coordinate system including X-, Y-, and Z-axes is provided on the image sensing plane S. The point O is the origin of this rectangular coordinate system. The Z-axis is perpendicular to the image sensing plane S, corresponding to the optical axis of the image pickup device 13. The X'-axis is an orthogonal projection of the X-axis onto the display plane S'. An angle between the X-axis and the X'-axis is a horizontal tilting angle $\theta$X. The Y'-axis is an orthogonal projection of the Y-axis onto the display plane S'. An angle between the Y-axis and the Y'-axis is a vertical tilting angle $\theta$Y. The Z'-axis is normal to the display plane S' at the origin O. An angle between the Z-axis and the Z'-axis is a rotating angle $\theta$Z of the image sensing plane with respect to the display plane S'.

Returning to FIGS. 6A to 6D, when the power is turned on, the controller 7 starts execution of the control program stored in the memory 8. The image pickup probe 4 is also driven. The AF mechanism 41 drives the focusing lens so that an image in a selected pickup region Accd focuses on the image sensing plane of the image pickup device 13. In this way, the state of FIG. 6B is attained to enable misconvergence measurement.

In the case of measuring misconvergence in the vertical direction, the automatic focusing is executed based on an image signal from the horizontal line measurement spot 23. Similarly, in the case of measuring misconvergence in the horizontal direction, the automatic focusing is executed based on an image signal from the vertical line measurement spot 24. In this autofocusing, the focus is adjusted to the horizontal line measurement spot 23 or vertical line measurement spot 24 which is used for misconvergence measurement. Accordingly, the reliability of the picked up image data is remarkably improved, reducing integrated errors which occur in repeated measurements.

Subsequently, a tilting angle $\theta$ ($\theta$X, $\theta$Y) and magnification $\beta$0 of the lens assembly 12 are inputted via the input device 10.

It may be appropriate to calculate the tilting angle $\theta$ ($\theta$X, $\theta$Y) based on obtained image data to eliminate the operation of inputting it via the input device 10. Also, it may be appropriate to provide a detector for detecting the position of the zooming lens of the lens assembly 12 or the rotating angle of the zooming ring 15 to directly provide the magnification $\beta$ to the controller 7 from the detector.

Measurement is started by turning on the switch 17. Upon the measurement a start signal is sent to the controller 7, an image signal, picked up by the image pickup device 13, sent to the image pickup circuit 14 and separated into red, green and blue primary color image signals, which are sent to the image data memory circuit 6. The color image signals are converted into digital image data by the A/D converter 61 and once stored in the respective backup memories 6a, 6b and 6c. The controller 7 calculates a misconvergence based on the image data of three primary colors stored in the backup memories 6a, 6b and 6c.

Next, the calculation will be described. From the red, green and blue image data stored in the backup memories 6a, 6b and 6c, individual color image data with respect to the vertical line measurement spot 24 are sampled, and respective luminous gravity centers rDX, gDX and bDX of the three color images are calculated. For example, the luminous gravity center rDX of the red image is calculated from the image data with respect to the red line hatched in FIG. 6D. Thereafter, using one of the luminous gravity centers rDX, gDX and bDX as a reference, for example gDX, deviations between the luminous gravity centers $\Delta$dRGX (=rDX−gDX), $\Delta$dBGX (=bDX−gDX) are calculated. Subsequently, a misconvergence $\Delta$Drgx, $\Delta$Dbgx in the horizontal direction (X-axis) of the CRT 1 are calculated based on the calculated luminous gravity center deviations, magnification $\beta$0, and tilting angle $\theta$X.

Figure 9:
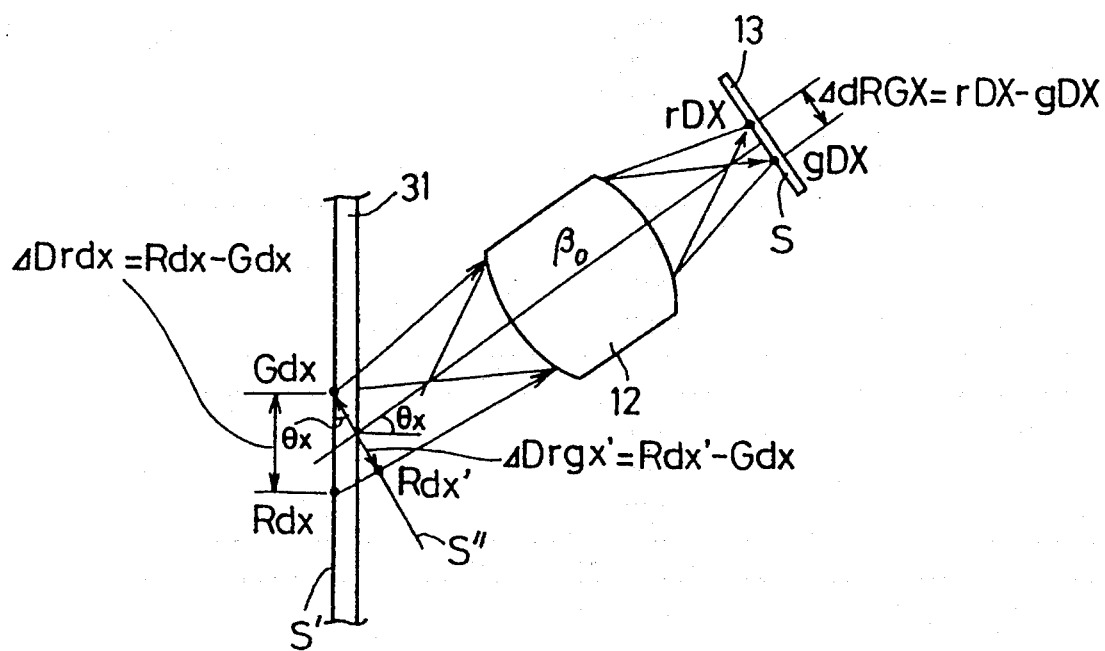
FIG. 9 is a diagram showing an optical relationship between an image bearing faceplate of the color CRT and the tilting image sensing plane of the image pickup device.

FIG. 9 shows a relationship between the image data deviation $\Delta$dRGX and the misconvergence $\Delta$Drgx when the image sensing plane S of the image pickup device 13 is tilted at an angle of $\theta$x with respect to the display plane S' of the CRT 1.

In FIG. 9, Gdx and Rdx are luminous gravity centers of green and red line images on the display plane S' of the CRT 1, respectively. Rdx' is an apparent luminous gravity center which is provided by orthogonal projection of the luminous gravity center Rdx on a plane S" containing the luminous gravity center Gdx and is tilting the angle $\theta$X with respect to the display plane S'. Accordingly, the deviation $\Delta$Drgx (=Rdx−Gdx) of the luminous gravity center Rdx from the luminous gravity center Gdx is a true misconvergence. The deviation $\Delta$Drgx' (=Rdx'−Gdx) of the luminous gravity center Rdx' from the luminous gravity center Gdx is an apparent misconvergence.

As seen from FIG. 9, $$\Delta Drgx' = \Delta dRGX/\beta 0$$

$$\Delta Drgx' = \Delta dRGX \times \cos \theta X$$

Thus, the misconvergence $\Delta$Drgx is calculated from the deviation $\Delta$dRGX, the magnification $\beta$0 and the tilting angle $\theta$X by EQUATION 1:

$$\Delta Drgx = \Delta Drgx'/\cos\theta X \quad \text{EQUATION 1}$$
$$= \Delta dRGX/(\beta 0 \times \cos\theta X)$$

Similarly, a misconvergence $\Delta Dbgx$ is calculated by EQUATION 2:

$$\Delta Dbgx = \Delta Dbgx'/\cos\theta X \quad \text{EQUATION 2}$$
$$= \Delta dBGX/(\beta 0 \times \cos\theta X)$$

Further, misconvergences $\Delta Drgy$ and $\Delta Dbgy$ for the vertical direction (Y-axis) are calculated in a similar manner. More specifically, from the red, green and blue image data stored in the backup memories 6a, 6b and 6c, their respective image data are sampled within the horizontal line measurement spot 23 as shown in FIG. 6C, and luminous gravity centers rDY, gDY and bDY for the three color images are calculated.

Specifically, the luminous gravity center rDY of the red image is calculated from the image data of the red line hatched in FIG. 6C. Accordingly, using the luminous gravity center gDY as a reference, deviations of the luminous gravity centers $\Delta dRGY$ ($=rDY-gDY$) and $\Delta dBGY$ ($=bDY-gDY$) are calculated.

Finally, misconvergences $\Delta Drgy$ and $\Delta Dbgy$ for the vertical direction of the CRT 1 are calculated from the above-calculated deviations $\Delta dRGY$ and $\Delta dBGY$, magnification $\beta 0$, and tilting angle $\theta Y$ by EQUATIONs 3 and 4:

$$\Delta Drgy = \Delta Drgy'/\cos\theta Y \quad \text{EQUATION 3}$$
$$= \Delta dRGY/(\beta 0 \times \cos\theta Y)$$

$$\Delta Dbgy = \Delta Dbgy'/\cos\theta Y \quad \text{EQUATION 4}$$
$$= \Delta dBGY/(\beta 0 \times \cos\theta Y)$$

The calculated misconvergences $\Delta Drgx$, $\Delta Dbgx$, $\Delta Drgy$, and $\Delta Dbgy$ are stored in the memory 8 while being sent to the output device 9 for printout or display.

In this way, the measurement of misconvergence for the one pickup region Accd is completed. If necessary, however, a misconvergence for other pickup regions Accd is measured by carrying out the same procedure.

Also, it may be appropriate to provide a plurality of image pickup probes 4 to pick up respective images in a plurality of pickup regions Accd simultaneously. Image signals obtained by the respective image pickup probes 4 are sent to the measuring main body 5. The measuring main body 5 processes the image signals to produce respective image data for the plurality of pickup regions Accd and calculates a misconvergence for each of the pickup regions Accd.

In this embodiment, to detect the focal lens position, the calculation is carried out of finding out a minimum change rate or differential value of sharpness of the picked up image with respect to the position of the focusing lens the lens assembly 12. However, it may be appropriate to calculate a root-mean-square (hereinafter referred to as RMS) value of image data obtained by individual pixels of the image pickup device 13, and determine a focusing lens providing a maximum RMS value as the focal lens position.

Further, it may be appropriate to detect a contrast at an edge portion of a target image to find out the focal lens position. Specifically, it is known that when the in-focus state is attained, an edge portion of the subject provide maximum contrast. Accordingly, the change of luminance at an edge portion is detected for a maximum contrast while moving the focusing lens.

Figure 10:
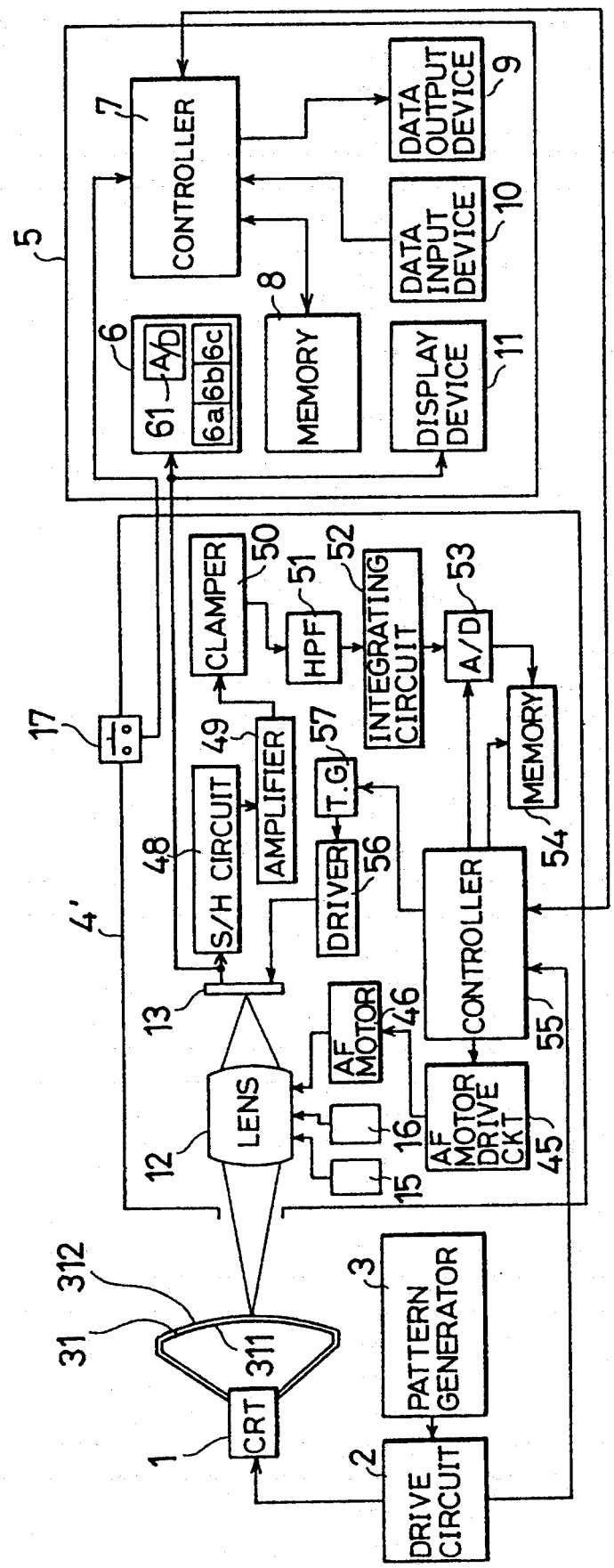
FIG. 10 is a block diagram showing an overall construction of a second measurement device of the invention.

FIG. 10 is a block diagram showing an overall construction of a second measurement device of the invention. This embodiment is provided with another autofocusing mechanism. Parts of the second embodiment which are identical to those of the first embodiment are denoted by like reference numerals.

This embodiment has an image pickup probe 4' carrying a sample hold circuit 48 (hereinafter referred to as S/H circuit) for sampling and holding an image signal produced by an image pickup device 13, an amplifier 49 for amplifying the image signal, a clamper 50 for performing black level correction, a high-pass filter 51 (hereinafter referred to as HPF) 51 for sampling high-frequency components from the image signal, an integrating circuit 52 for integrating the high-frequency components sampled by the HPF 51, an A/D converter 53 for converting the analog integral signal produced by the integrating circuit 52 into a digital integral signal, and a memory 54 for storing the digital integral signal. Further, the image pickup probe 4' includes a controller 55 for controlling image pickup and autofocusing operations of the image pickup probe 4', a driver 56 for driving the image pickup device 13, and a timing signal generator 57 for generating a timing signal for the driver 56.

The controller 55 is communicatable with a controller 7 in a measuring main body 5 to control image pickup operations of the image pickup device 13 while communicating with the controller 7. Specifically, the controller 55 transmits a control signal to the timing signal generator 57. The timing signal generator 57 produces a timing signal according to the control signal, and sends it to the driver 56. Upon receiving the timing signal, the driver 56 controls charging (picking up) and discharging of the image pickup device 13. Also, the controller 55 receives a vertical synchronizing signal from a drive circuit 2 for a CRT 1.

Automatic focusing is carried out in the following manner. Upon detecting a rising edge or falling edge of the vertical synchronizing signal from the drive circuit 2, the controller 55 transmits a control signal to the timing signal generator 57 to initiate an image pickup operation. At this point, the image pickup device 13 starts storing of electric charges. When the falling edge or rising edge of the next vertical synchronizing signal is detected, the controller 55 transmits a control signal to the timing signal generator 57 to terminate the image pickup operation.

This construction causes the image pickup device 13 to continue picking up of an image in a pickup region Accd during one cycle of vertical scanning. Accordingly, the image in the pickup region Accd can be entirely picked up.

The electric charge (or image signal) accumulated by the image pickup device 13 in synchronism with the vertical synchronizing signal of the CRT 1 is read out by the S/H circuit 48 according to the timing signal produced by the timing signal generator 57. The image signal is amplified by the amplifier 49, and applied with black level correction by the clamper 50, and only high-frequency components are sampled out by the HPF 51.

In accordance with the controller 55, the high-frequency components of the image signal are integrated by the integrating circuit 52, converted into a digital signal by the A/D converter 53 and stored in the memory 54.

The controller 55, while repeating the sequence of picking up test pattern images, compares a current digital integral signal with that obtained in the preceding cycle to control the AF motor 46 via the AF motor drive circuit 45 so as to move the focusing lens of the lens assembly 12 to a predetermined position.

Specifically, the digital integral signal provides a greater value as the lens assembly 12 approaches the focal state. The controller 55 continues moving the focusing lens in the same direction during the time when the digital integral signal provides a greater value than in the preceding cycle. Upon the digital integral signal providing a smaller value, the controller 55 causes the focusing lens to move in the reverse direction. The controller 55 repeats these operations and stops the moving of the focusing lens when the digital integral signal provides a maximum value. Consequently, the focal state of the lens assembly 12 is attained.

In this embodiment, the image pickup operation of the image pickup device 13 is controlled in accordance with the vertical synchronizing signal of the CRT 1, which accordingly prevent such partial picking up as picking up an upper or lower half of an image in the pickup region Aced. This assures a stabilized digital integral signal for the autofocusing operation. The focusing state can be checked exactly and the lens assembly 12 can be thus set in the in-focus state more accurately.

In this embodiment, also, the image pickup device 13 picks up a test pattern image during the interval of vertical synchronizing signal of the CRT 1. However, it may be appropriate to render the image pickup device 13 pick up a test pattern image during an integral multiple of the interval of vertical synchronizing signal.

In this embodiment, further, the vertical synchronizing signal is inputted from the drive circuit 2 of the CRT 1 to the controller 55 of the image pickup probe 4'. As an alternative, a previously measured or already known interval (or frequency) of vertical synchronizing signal of the CRT 1 may be inputted to the controller via an input device 10 and the controller 7 to control the picking-up time of the image pickup device 13.

Figure 11:
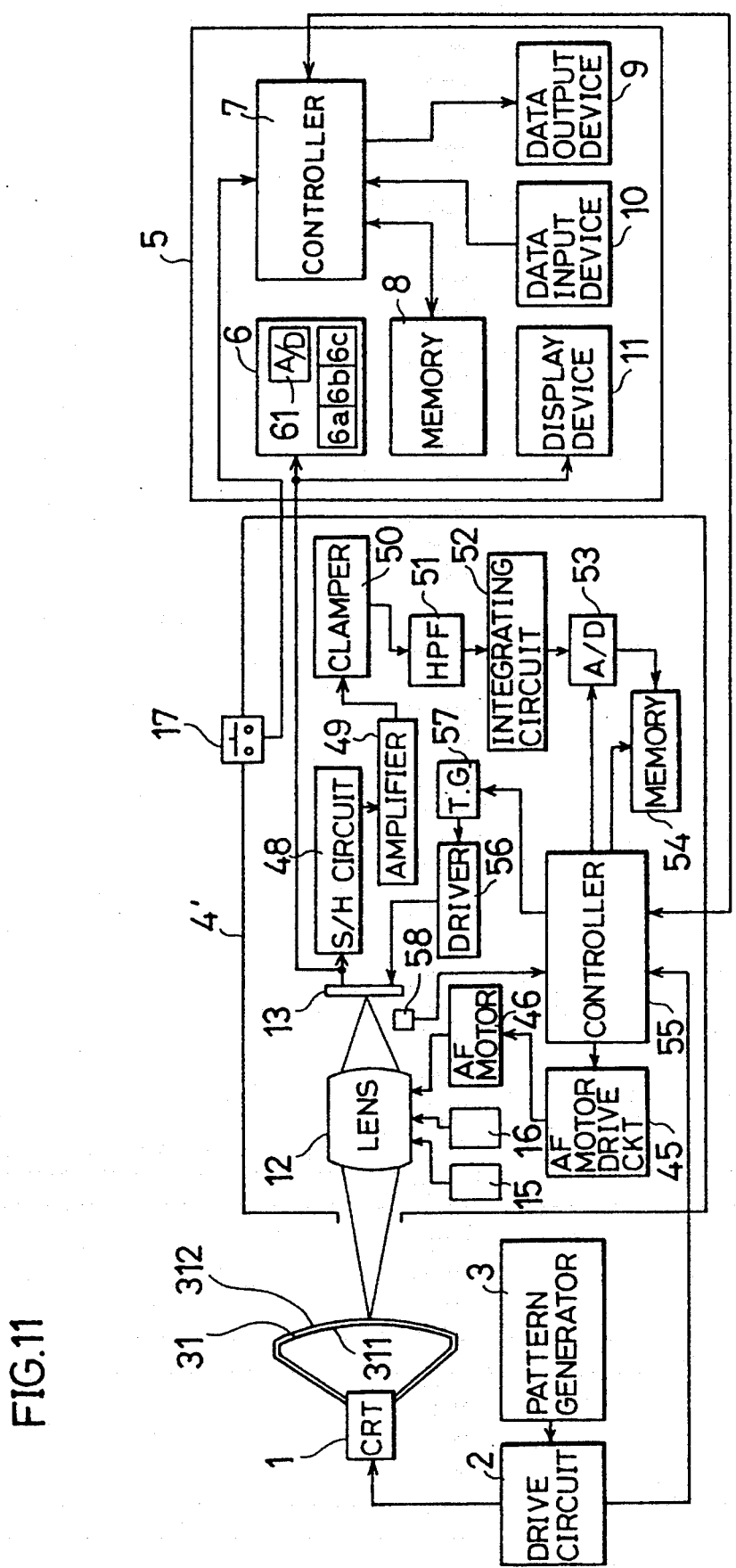
FIG. 11 is a block diagram showing an overall construction of a third measurement device of the invention.

FIG. 11 shows an overall construction of a third measurement device of the invention. This measurement device has the same construction as the second measurement device except for provision of a silicon photocell 58 (hereinafter referred to as SPC) in a vicinity of an image pickup device 13. The SPC is adapted for detecting the glowing state of the pickup region Aced. The glowing interval of the pickup region Aced coincides with the interval of vertical synchronizing signal of the CRT 1. Accordingly, it is possible to control the picking-up time of the image pickup device 13 based on the glowing interval.

In the second and third embodiments, the picking-up time of the image pickup device 13 is set to be the same as the interval of vertical synchronizing signal or an integral multiple of an interval of vertical synchronizing signal to entirely pick up a target image in the pickup region Aced. However, it could be understood that the same effect is obtainable by performing the picking-up at least during a time when a target image in the pickup region Aced is scanned in one cycle of the vertical synchronizing signal.

Figure 12:
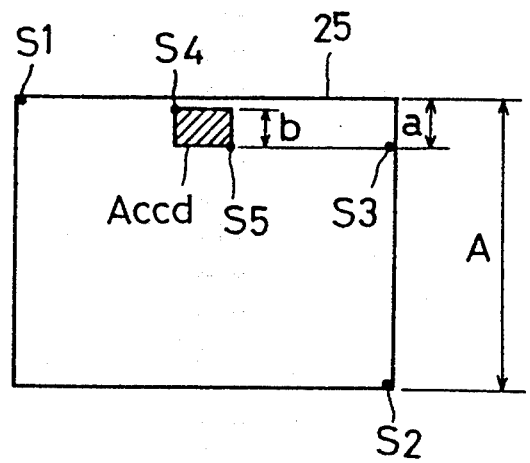
FIG. 12 is a diagram showing a position of the pickup region relative to the display plane of the color CRT.

Specifically, it is now assumed that a pickup region Aced is positioned at an upper middle portion of the display plane 25 of the CRT 1 as shown in FIG. 12. The scanning is performed from the point S1 at the upper left corner of the display plane 25 to the point S2 at the lower right corner of the display plane 25. The interval of vertical synchronizing signal is the time during which the scanning is performed from the point S1 to the point S2, and returned to the point S1.

In order to entirely pick up an image in the pickup region Accd, the image pickup device 13 is driven at least during a time when the scanning is performed from the point S4 at the upper left corner of the pickup region Accd to the point S5 at its lower right corner.

Figure 13:
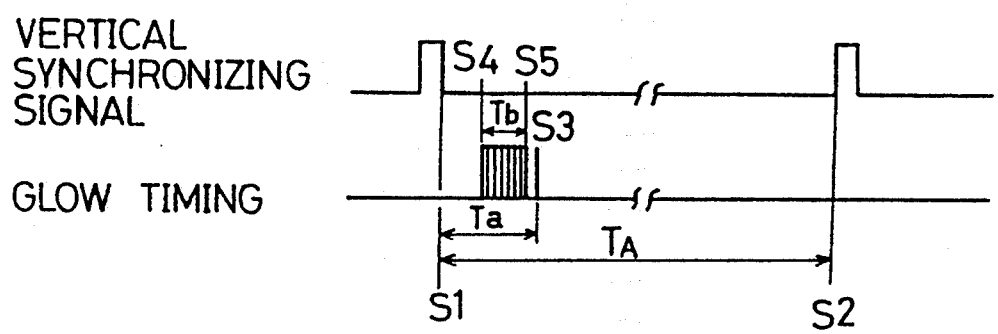
FIG. 13 is a timing chart showing a relationship between scanning of the pickup region and vertical synchronizing signal of the color CRT.

FIG. 13 is a timing chart showing the relationship between the scanning time of the pickup region Accd and the vertical synchronizing signal of the CRT 1. S1 to S5 indicated in FIG. 13 correspond to the glow timing at the points S1 to S5 shown in FIG. 12. Also, indicated at TA is the time duration for scanning from the point S1 to the point S2. Indicated at Ta is the time duration for scanning from the point S1 to the point S3. Indicated at Tb is the time duration for scanning from the point S4 to the point S5. Accordingly, the image in the pickup region Accd is entirely picked up by driving the image pickup device 13 during the time duration Tb.

As means of controlling the image pickup device 13 so as to drive for the time duration Tb, it may be appropriate to provide an SPC at an upper left corner of the image pickup device 13 and another SPC at a lower right corner of the image pickup device 13 to detect respective glows of points S4 and S5, and start the driving of the image pickup device 13 at the glow at the point S4 and stop the driving of the image pickup device 13 at the glow at the point S5.

It is preferable to control the picking-up of the image pickup device 13 by detecting glows at the points S4 and S5 as the third embodiment. However, if the size and position of the pickup region Accd are known, it may be appropriate to execute the following easier control.

Assuming that the vertical length of the display plane 25 of the CRT 1 is A, and the distance from the upper edge of the display plane 25 of CRT 1 to the lower edge of the pickup region Accd is as shown in FIG. 12, the vertical length A and the distance a correspond to the time duration TA and the time duration Ta shown in FIG. 13, respectively. Accordingly, the following equation can be written:

$$a/A = Ta/TA < 1$$

When the pickup region Accd exists within the distance a from the upper edge of the CRT 1, the image in the pickup region Accd can be entirely picked up by driving the image pickup device 13 for the time duration Ta.

Accordingly, the image in the pickup region Accd can be entirely picked up by setting the picking-up time of the image pickup device 13 in the time duration Ta satisfying the equation: $a/A < Ta/TA < 1$; and starting the driving of the image pickup device 13 at the rising edge of the vertical synchronizing signal and stopping the driving after a lapse of the time duration Ta.

Also, it may be appropriate to provide only an SPC for detecting glow at the point S4. Specifically, the image pickup device 13 is driven at the time when glow at the point S4 is detected, and is stopped after a lapse of the time duration Tb defined by the following equation:

$$Tb = TA \times Parea/Varea$$

wherein TA denotes the interval of vertical synchronizing signal, Parea denotes the area of the pickup region Accd, and Varea denotes the area of the display plane.

Further, it may be appropriate to provide an SPC for detecting glow at a given point in the pickup region Accd. Specifically, the glowing interval is calculated based on a detection signal from the SPC to find out a next glowing time. The image pickup device 13 is driven for the time duration Tb including the next glowing time and having a duration defined by the following equation:

$$Tb = TA \times Parea/Varea$$

wherein TA denotes the interval of vertical synchronizing signal, Parea denotes the area of the pickup region Accd, and Varea denotes the area of the display plane.

Further, it may be possible to drive the image pickup device 13 for slightly greater than the time duration Tb.

Figure 14:
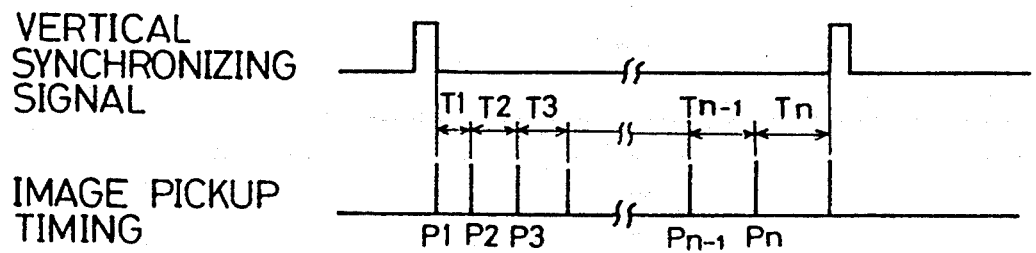
FIG. 14 is a timing chart showing a relationship between driving of the image pickup device and the vertical synchronizing signal.

Moreover, it may be appropriate to drive the image pickup device 13 at different timings timing Pi (i=1, 2, ... n) and for different time durations Ti (i=1, 2, ... n) within the interval of vertical synchronizing signal as shown in FIG. 14 to detect a glowing duration based on respective image signals of the different time durations, and to drive the image pickup device 13 again for the detected glowing duration to entirely pick up the image in the pickup region Accd.

As described above, the image pickup device 13 is driven not for the interval of vertical synchronizing signal, but for the partial duration of the vertical synchronizing signal interval which includes the scanning time of the pickup region Accd. Accordingly, a reduced time is consumed to integrate the image signal, providing a quick control for the autofocusing. Also, since the image pickup device 13 is not driven when the pickup region Accd is not scanned, an undesirable dark current is reduced, contributing to an improved accurate autofocusing.

Figure 15:
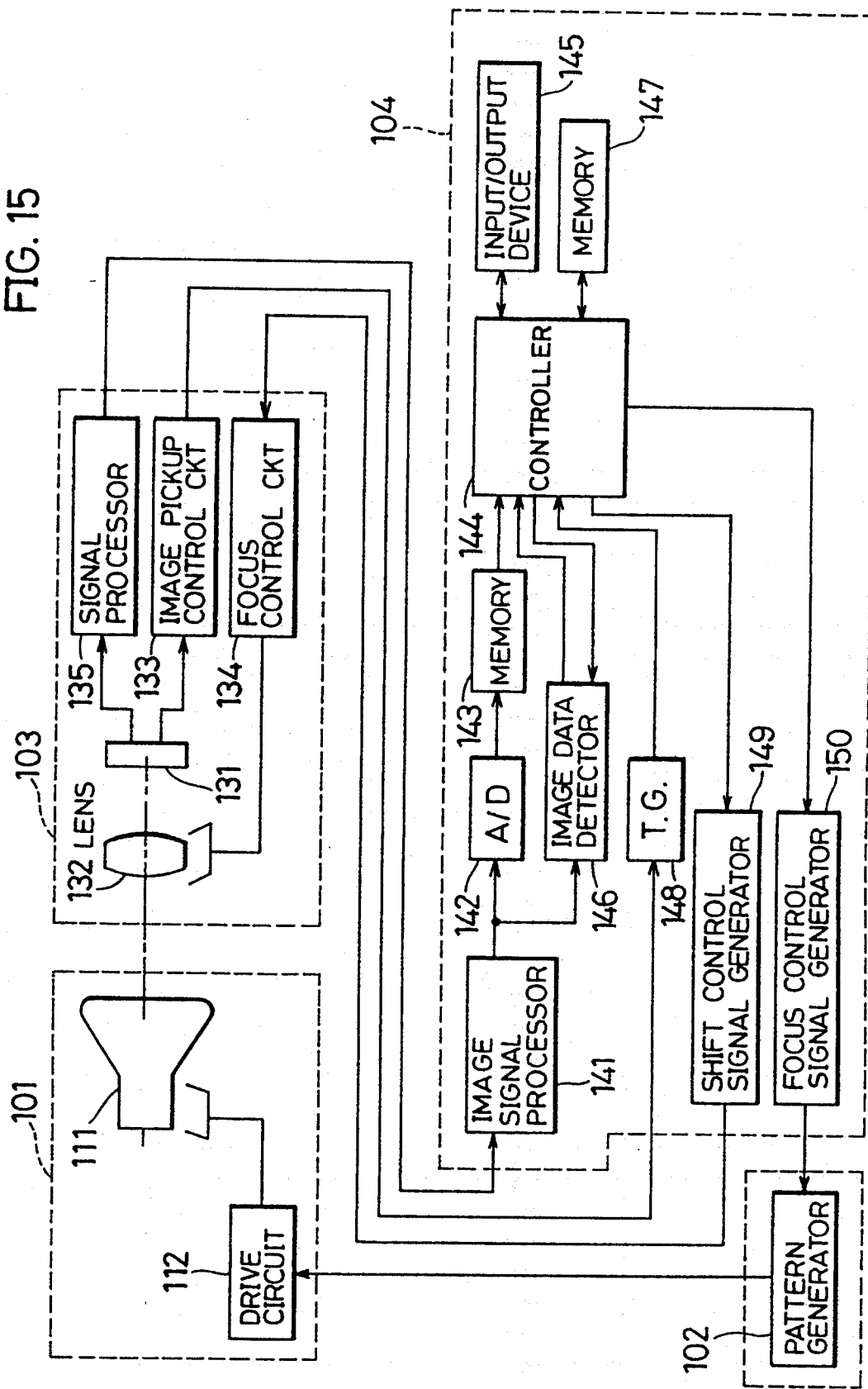
FIG. 15 is a block diagram showing an overall construction of a fourth measurement device of the invention.

FIG. 15 is a block diagram showing an overall construction of a fourth measurement device of the invention. In FIG. 15, indicated at 101 is a color display unit, indicated at 102 is a pattern generator for generating a test pattern for measurement. The color display unit 101 includes a color CRT 111 and a drive circuit 112 for driving the color CRT 111. The pattern generator 102 sends a test pattern video signal to the drive circuit 112. According to the test pattern video signal from the pattern generator 102, the drive circuit 112 generates a drive signal and sends it to the CRT 111. The CRT 111, according to the drive signal, emits three electron beams for red, green and blue primary colors toward an inner surface of a faceplate of the CRT 111 to display the test pattern on a display plane owing to excitation of given phosphors.

Further, indicated at 103 is an image pickup probe for picking up an image of the test pattern displayed on the CRT 111, indicated at 104 is a measuring main body for calculating a misconvergence based on an image signal produced by the image pickup probe 103.

A variety of test patterns are used for misconvergence measurement. However, it is convenient to use a crosshatch pattern having vertical and horizontal lines crossing one another at right angles or a polka dot pattern consisting of a number of small dots. In this embodiment, a crosshatch pattern is used as a test pattern.

Figure 19:
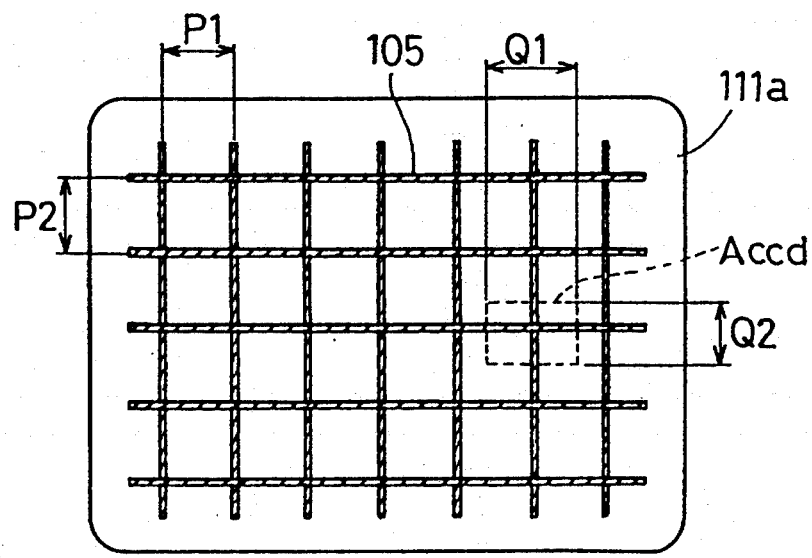
FIG. 19 is a diagram showing a relationship between a mesh pitch of a crosshatch test pattern displayed on the CRT for misconvergence measurement and a size of the pickup region.

FIG. 19 shows a crosshatch pattern used in this embodiment. In FIG. 19, indicated at 111a, is the display plane of the CRT 111, indicated at 105 is the crosshatch pattern, and indicated at 103a is a pickup region. Similarly to the preceding embodiments, the crosshatch pattern 105 has such a mesh interval that the pickup region Accd contains at least one intersection regardless of the setting position of the image pickup probe 103.

Referring again to FIG. 15, the image pickup probe 103 includes an image pickup device 131 having a color CCD, a lens assembly 132, an image pickup control circuit 133, a focus control circuit 134 for controlling focus adjustment of the lens assembly 132 according to a focus control signal sent from the measuring main body 104, and a signal processor 135 for performing signal processing, such as amplification of an image signal from the image pickup device 131, and sending a processed signal to the measuring main body 104.

As described above, the image pickup probe 103 picks up an image of the crosshatch pattern 105 displayed on the CRT 111 and sends an image signal to the measuring main body 104 after amplification and other signal processing. Also, the image pickup probe 103 adjusts the lens assembly 132 according to the focus control signal from the main measuring unit 104 to focus on a target image in the pickup region Accd for measurement of misconvergence.

The measuring main body 104 includes an image signal processor 141 for applying a predetermined signal processing to an image signal sent from the image pickup probe 103, an A/D converter 142 for converting an analog image signal to a digital image signal, an image signal memory 143 for storing a digital image signal, a controller 144 for controlling misconvergence measurement operation, an input/output device 145 for inputting and outputting data, a data discriminator for discriminating whether or not image data with respect to the image in the pickup region Accd each subregion, a memory 147 for storing discriminated image data, a timing signal generator 148 for generating a timing signal to read the image signal each subregion, a focus control signal generator 149 for generating focus control signal to focus on an image in a selected subregion, and a shift control signal generator 150 for generating a shift control signal to shift the crosshatch pattern as necessary.

Figure 16:
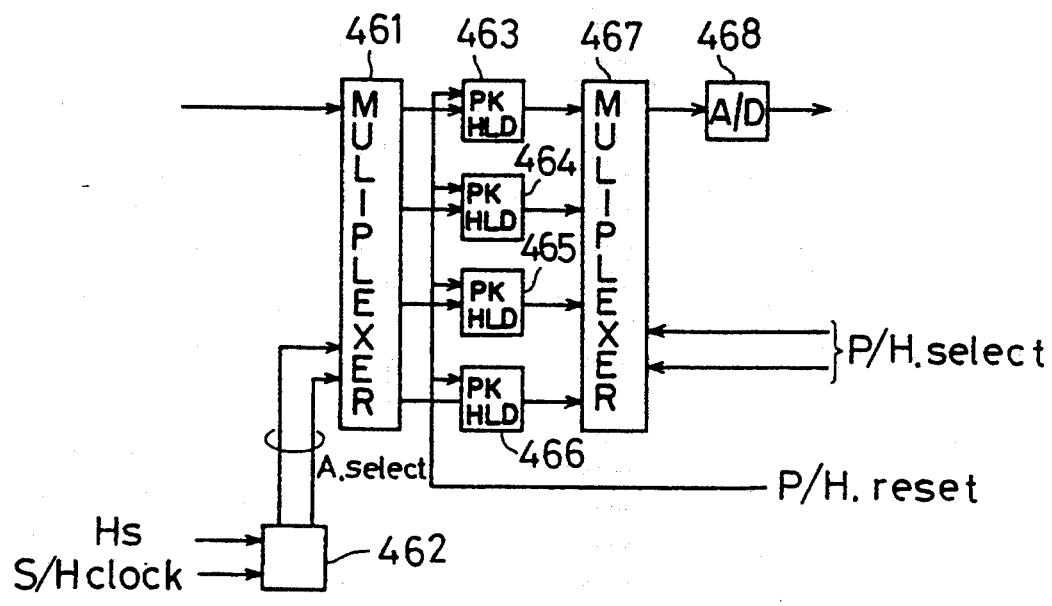
FIG. 16 is a block diagram showing a construction of a data discriminator of the fourth measurement device.
Figures 20, 21:
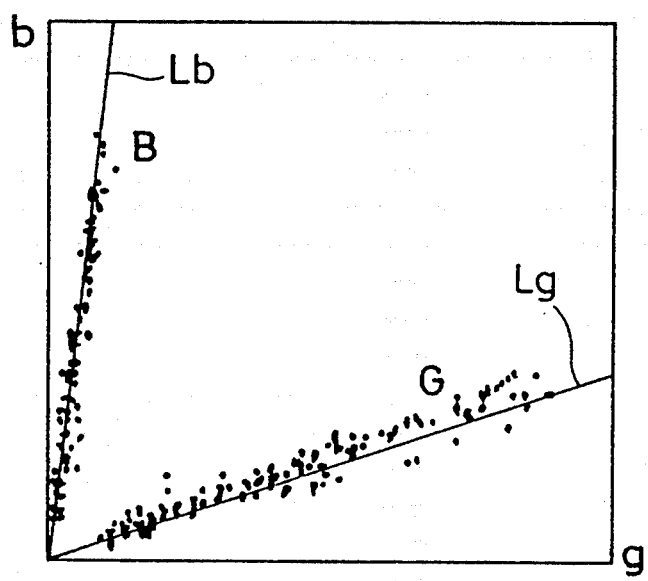
FIG. 20 is a diagram showing an arrangement of sixteen subregions of one pickup region.
FIG. 21 is a diagram showing a distribution of outputs of green and blue pixels of the image pickup device with respect to green and blue phosphor images on the color CRT.

FIG. 16 is a block diagram showing a construction of the data discriminator 146. The data discriminator 146 checks the image signal with respect to the pickup region Accd each of sixteen subregions A(i, j ; i, j = 1, 2, 3, 4) which are defined by dividing the pickup region Aced as shown in FIG. 20. Specifically, the data discriminator 146 discriminates based on the output level of the image signal each subregion A(i, j) whether or not there is image data representing the image in the pickup region Accd in the subregion A(i, j), and sends discriminated image data to the controller 144. The controller 144 produces binary image information by a process to be described later. The memory 147 stores image information in positions corresponding to the subregions A(i, j).

Figures 22, 23A, 23B:
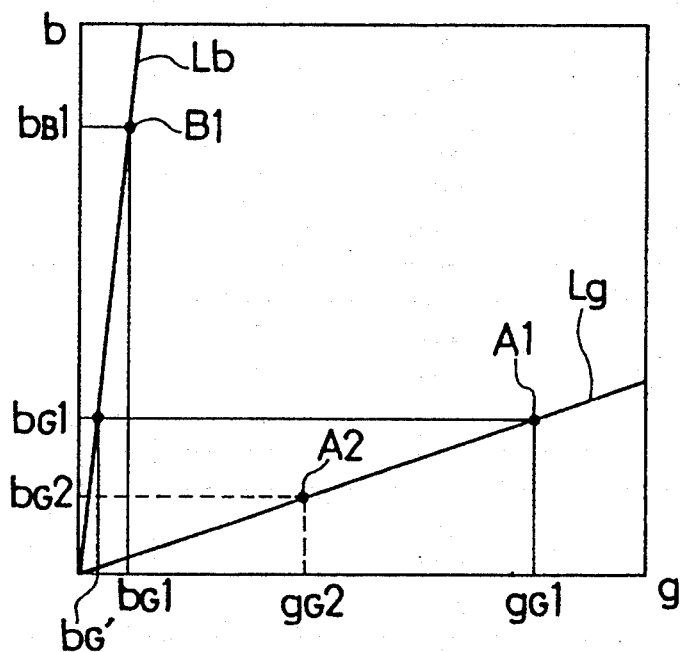
FIG. 22 is a graph showing a general relationship of the distribution of FIG. 21.
FIG. 23A is a diagram showing a binary digital representation of a crosshatch pattern image within the pickup region, an intersection of the crosshatch pattern image not being on an end portion of the pickup region.
FIG. 23B is a diagram showing another binary digital representation of a crosshatch pattern image within the pickup region, an intersection of the crosshatch pattern image being on an end portion of the pickup region.

The binary image information indicates whether a given subregion A(i, j) contains any part of the crosshatch pattern 105. A subregion containing any part of the crosshatch pattern 105 is expressed by a logic "1," while a subregion containing no part of the crosshatch pattern 105 is expressed by a logic "0", for example. The image information provides a representation of the crosshatch pattern image in the selected pickup region Accd as shown in FIGS. 23A and 23B, for example, making it possible to determine whether the pickup region Accd is suitable for misconvergence measurement.

A detailed description on the production of the image information and judgment of the suitability of image pickup region for misconvergence measurement will be discussed later.

Referring to FIG. 16, indicated at 461 is a multiplexer for separating red, green and blue primary color signals sent from the image signal processor 141 each subregion A(i, j). Specifically, signals picked up by individual pixels of the image pickup device 131 (hereinafter referred to as pixel signals) are time-sequentially read out along raster scanning lines and delivered to the multiplexer 461 via the image signal processor 141. The multiplexer 461 divides number of pixel signals (n signals in this embodiment) contained in each scanning line into a predetermined number of portions (j columns in this embodiment), and sends the divided pixel signal (n/j pixel signals) for each subregion to corresponding peak hold circuits 463–466, to be described later. The separation of the pixel signal is carried out for red, green and blue primary colors simultaneously.

In the case of separating the image signal each of the sixteen subregions A(i, j) as shown in FIG. 20, pixel signals G(1, 1) to G(1, n) contained in the first scanning line are allocated to the following four columns: G(1, 1) to G(1,n/4), G(1, n/4+1) to G(1, 2n/4), G(1, 2n/4+1) to G(1, 3n/4), and G(1, 3n/4+1) to G(1, n). The pixel signals of each column are sent to their respective peak hold circuits 463–466. Pixel signals G(p, q; p=2 to m, q=1 to n) of the second to m-th scanning lines are similarly separated into four columns each, and sent to the respective peak hold circuits 463–466.

More specifically, each of the peak hold circuits 463–466 has internal blocks for three primary colors. Pixel signals for red separated into individual columns are sent to the corresponding "red" blocks of the peak hold circuits 463–466, for example. Pixel signals for green and blue are processed in a similar way.

Referring again to FIG. 16, indicated at 462 is a counter for generating a control signal to control the operation of the multiplexer 461. In accordance with an input signal from the image pickup control circuit 133 of the image pickup probe 103, the timing signal generator 148 produces a vertical synchronizing signal Vs and a horizontal synchronizing signal Hs to control the drive of the image pickup device 131 respectively, and a sample-and-hold clock (hereinafter referred as S/H clock) to control a readout timing of individual pixels, and sends these signals to the counter 462. The counter 462 is reset in synchronism with the HS signal and produces a control signal "A. select" consisting of a group of pulses of which polarity is reversed at a predetermined interval, and sends the "A. select" signal to the multiplexer 461.

The renewal interval of the "A. select" signal corresponds to a time duration which is obtained by dividing the interval of the Hs signal by the number of columns, i.e., j columns. The counter 462 counts the number of pulses of the S/H clock and produces the "A. select" signal by altering the signal state each time the pulse number of the S/H clock is incremented by n/j, where n is the number of pixels in one scanning line contained in the pickup region Accd and j is the number of columns. In FIG. 20, the counter 462 produces the "A. select" signal by altering the signal state at count numbers n/4, n/2 and 3n/4.

The peak hold circuits 463–466 detect the level of the pixel signals contained in each subregion A(i, j) and hold their respective peak values. Each of the peak hold circuits 463–466 is provided with internal circuits (not illustrated) for red, green and blue primary colors. Indicated at 467 is a multiplexer for sequentially outputting the peak values held by the peak hold circuits 463–466 to the A/D converter 468.

More specifically, peak values of red pixel signals of each subregion A(i, j) are sequentially outputted from the peak hold circuits 463–466 at first. For example, peak values of green and blue pixel signals of each subregion A(i, j) are outputted in order and in a similar manner. The A/D converter 468 converts the peak values from the multiplexer 467 into digital values.

The controller 144 receives the vertical synchronizing signal Vs and horizontal synchronizing signal Hs to control the driving of the image pickup device 131. In accordance with the synchronizing signals Vs and Hs, the controller 144 generates a reset signal "P/H reset" and a control signal "P/H select" shown in FIG. 18, and sends these signals to the peak hold circuits 463–466 and multiplexer 467, respectively.

The "P/H reset" signal is adapted for resetting the peak hold circuits 463–466. The "P/H select" signal is adapted for altering the state of signal every division of the pulse interval of the vertical synchronizing signal Vs, to control the driving of the multiplexer 467. There are four vertical divisions in this embodiment.

The multiplexer 461 divides the red, green and blue pixel signals sent in parallel from the image signal processor 141 in the horizontal direction, in accordance with the "A. select" signal, and sends the divided pixel signals to the corresponding peak hold circuits 463–466.

Figure 17:
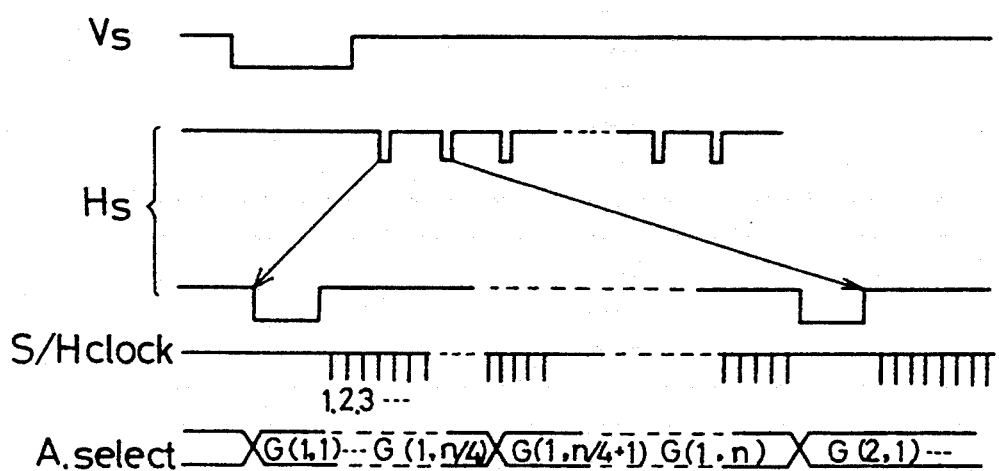
FIG. 17 is a timing chart showing a relationship between control signals of the color CRT and a control signal for dividing a horizontal line image into a desired number of portions.

Referring to FIG. 17, the counter 462 is reset at time T1 corresponding to a falling edge of the Hs signal, while the multiplexer 461 sends the red, green and blue pixel signals sent from the image signal processor 141 to the corresponding circuits of the peak hold circuit 463.

Next, when the state of the "A. select" signal changes at time T2, the multiplexer 461 sends the red, green and blue pixel signals from the image signal processor 141 to the corresponding circuits of the peak hold circuit 464. Subsequently, the multiplexer 461 sends the red, green and blue pixel signals from the image signal processor 141 to the corresponding circuits of the peak hold circuits 465 and 466 in order each time the state of the "A. select" signal changes.

Upon all the pixel signals in the first scanning line being divided, the counter 462 is reset at time T3 corresponding to a next falling edge of the Hs signal and the multiplexer 461 sends the red, green and blue pixel signals of the second scanning line from the image signal processor 141 to the corresponding circuits of the peak hold circuits 463–466.

Figure 18:
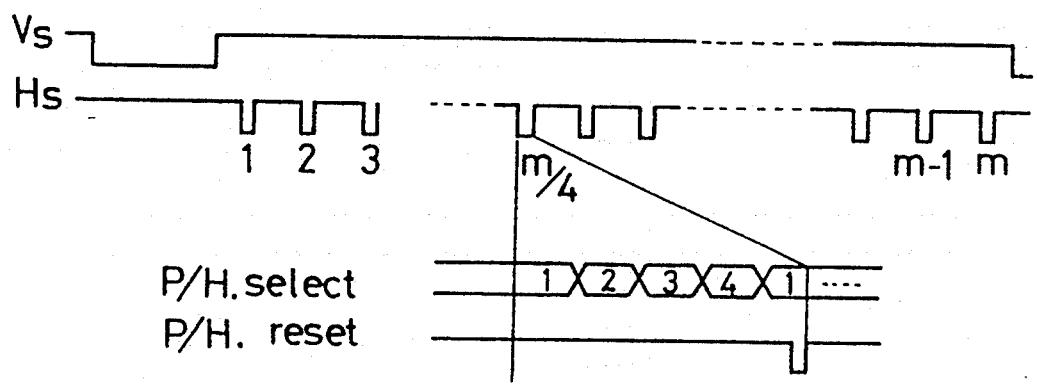
FIG. 18 is a timing chart showing a relationship between control signals of the color CRT and another control signal for dividing a vertical line image into a desired number of portions.

When the multiplexer 461 completes the dividing the pixel signals of the m/4-th scanning line, the controller 144 sends the "P/H select" signal as shown in FIG. 18 and the peak values of the subregions A(1, 1) to A(1, 4) are sequentially sent from the peak hold circuits 463–466 to the A/D converter 468 via the multiplexer 467. Also, the controller 144 sends a "P/H reset" pulse to reset the peak hold circuits 463–466. The peak values are converted into digital values by the A/D converter 468 and sent to the controller 144.

The pixel signals of the (m/4+1)-th to m-th scanning lines are divided in the same manner and the peak values of the subregions A(2, 1) to A(2, 4), A(3, 1) to A(3, 4) and A(4, 1) to A(4, 4) are set to the processor/controller 144.

Described below is how binary image information, indicating whether a subregions contains any part of the crosshatch pattern, is obtained from the image data for each subregion.

FIG. 21 is a diagram showing an output distribution containing green and blue pixels of the image pickup device 131 with respect to green and blue phosphor images on the color display 101. In FIG. 21, the horizontal axis g indicates the output level of green primary color while the vertical axis b indicates the output level of blue primary color. A group of plots indicated at G represent outputs gG of green pixels and outputs bG of blue pixels with respect to the same green phosphor image. Also, a group of plots indicated at B represent outputs gB of green pixels and outputs bB of blue pixels with respect to the same blue phosphor image.

As shown in FIG. 21, there is a characteristic relationship between the outputs gG of green pixels and the outputs bG of blue pixels with respect to the same green phosphor image. The outputs (gG, bG) are distributed in vicinity of a straight line Lg. Similarly, the outputs (gB, bB) of green and blue pixels, with respect to the same blue phosphor image, are distributed in the vicinity of a straight line Lb.

FIG. 22 is a diagram showing a model of the output distribution shown in FIG. 21. For the purpose of the following discussion, intensities of the electron beams of the CRT 111 for red, green and blue are expressed by KR, KG and KB, spectral radiant characteristics of red, green and blue phosphors exposed to a unit beam intensity are expressed by RL, GL and BL, spectral sensitivities of red, green and blue pixels of the image pickup device 131 are expressed by rL, gL and bL, outputs of red, green and blue pixels when receiving a red phosphor image are expressed by rR, gR and bR, outputs of red, green and blue pixels when receiving a green phosphor image are expressed by rG, gG and bG, and outputs of red, green and blue pixels when receiving a blue phosphor image are expressed by rB, gB and bB, respectively. Accordingly, outputs of red, green and blue pixels (rR, gR, bR), (rG, gG, bG) and (rB, gB, bB) can be written as EQUATIONS 5, 6, and 7 below:

$$\begin{vmatrix} rR \\ gR \\ bR \end{vmatrix} = \int Kr \times Rl \times \begin{vmatrix} rL \\ gL \\ bL \end{vmatrix} dL \qquad \text{EQUATION 5}$$

$$\begin{vmatrix} rG \\ gG \\ bG \end{vmatrix} = \int Kg \times Gl \times \begin{vmatrix} rL \\ gL \\ bL \end{vmatrix} dL \qquad \text{EQUATION 6}$$

$$\begin{vmatrix} rB \\ gB \\ bB \end{vmatrix} = \int Kb \times Bl \times \begin{vmatrix} rL \\ gL \\ bL \end{vmatrix} dL \qquad \text{EQUATION 7}$$

From EQUATIONS 6 and 7, output gG of a green pixel and output bG of a blue pixel when receiving a green phosphor image can be written as the following EQUATIONS 8 and 9:

$$gG = \int KG \times gL \times GL \times dL \qquad \text{EQUATION 8}$$

$$bG = \int KG \times bL \times GL \times dL \qquad \text{EQUATION 9}$$

Further, from EQUATIONS 8 and 9, ratio K of output bG to output gG can be written as EQUATION 10 because the intensity KG of the electron beam is not affected by the wavelength L.

$$\frac{bG}{gG} = \frac{Kg \times \int bL \times GL \times dL}{Kg \times \int gL \times GL \times dL} = \frac{\int bL \times GL \times dL}{\int gL \times GL \times dL} \qquad \text{EQUATION 10}$$

The intensity KG of the electron beam is in relation with the brightness of the green phosphor image, and not in relation with the wavelength L as the above. Accordingly, ratios bG1/gG1 and bG2/gG2 which are calculated with respect to outputs A1(gG1, bG1) and A2(gG2, bG2) of green and blue pixels when receiving green phosphor images having different light intensities are equal to each other from EQUATION 6. It could therefore be understood that the two points A1 and A2 are plotted on the line Lg as shown in FIG. 22. Similarly, outputs (gB, bB) of green and blue pixels when receiving blue phosphor images having different light intensities is plotted on the line Lb.

It should be noted that when the electron beam intensities KG and the KB are increased, plot points of outputs (gG, bG) shift to the right side of the line Lg and plot points of outputs (gB, bB) shift to the upper side of the line Lb because the green and blue phosphor images will become brighter.

Since green pixels of the image pickup device 131 which have received the blue phosphor image provide outputs according to their spectral characteristics, the image signals produced by the green pixel contain signals caused by light from the blue phosphor image as shown in FIGS. 21 and 22. Similarly, since green pixels which have received the red or green phosphor image provide outputs according to their spectral characteristics, the image signals produced by the green pixels contain signals caused by light from the red, green and blue phosphor images. These are similar for image signals produced by the red and blue pixels.

It can be determined based on the peak values of the image signals of the green pixels that part of the crosshatch pattern 105 is contained in one subregion A(i, j). However, it is impossible to determine whether the part of the crosshatch pattern 105 is a green phosphor image because of the fact that there is a possibility that it contains signals derived from not only the green phosphor image but also the red and blue phosphor images.

The binary image information makes it possible to judge whether a subregion contains each red, green and blue image of the crosshatch pattern 105. The binary image information is generated by carrying out the following two discriminations based on peak values of image signals obtained by the red, green and blue pixels in each subregion:

1. To discriminate as to whether any part of the crosshatch pattern 105 is contained in the subregion; and 2. To discriminate as to whether the subregion contains a red, green and blue image of the crosshatch pattern if the subregion contains any part of the crosshatch pattern.

The first discrimination is carried out in the following manner. Output levels of three primary color pixels of the image pickup device 131, when receiving no color images of the crosshatch pattern (this state is referred to as a "dark" state), are taken as a reference level. The peak value of the subregion is compared with the reference level. Specifically, if the peak value of the subregion is equal to or less than the reference level, the subregion is discriminated to be in a "dark" state. Contrary to this, if the peak value of the subregion is larger than the reference level, the subregion is discriminated to contain a color image of the crosshatch pattern 105.

Next, the second discrimination is as follows. Referring now to FIG. 22, it is assumed that the image signal of a green pixel in the subregion is gG1 and the image signal of a blue pixel in the same subregion is bB1. If there is a blue phosphor image in the subregion, the image signals of the green pixels contain the image signal gB1. However, comparing to the image signal gG1, the image signal gB1 is neglectably small. Accordingly, it is judged that there is a high probability that a green phosphor image exists in the subregion.

Similarly, if there is a green phosphor image in the subregion, the image signals of the blue pixels contain the image signal bG1. However, comparing this to the image signal bB1, the image signal bG1 is neglectably small. Accordingly, it is judged that there is a high probability for a blue phosphor image to exist in the subregion.

Next, it is assumed that the image signal of a green pixel of the subregion is gG1 and the image signal of a blue pixel in the same subregion is bB1. Even if the image signal of the green pixel contain an image signal gB', comparing this to the image signal gG1, the image signal gB' is neglectably small. Accordingly, it is judged that there is a high probability for a green phosphor image to exist in the subregion. In this case, it is impossible to judge that a blue phosphor image exists in the subregion because the image signal picked up from the green phosphor image contained in the image signals of the blue pixels becomes bG1 as shown in FIG. 22.

Subsequently, similar judgments are carried out for the image signals of the red pixels. If it is judged based on the image signals of all the primary colors that there is a high probability for a green phosphor image to exist in the subregion, it is determined that only a green phosphor image exists and neither red nor blue phosphor image exists in the subregion.

In the case that a subregion contains a part of the crosshatch pattern, as mentioned above, the judgment is carried out of judging as to which of red, green and blue phosphor images of the crosshatch pattern 105 exists in the subregion.

FIGS. 23A and 23B show representations of a picked up image of the crosshatch pattern based on image information. FIG. 23A shows a state that an intersection of the crosshatch pattern does not lie on an end subregion of a selected pickup region Accd. FIG. 23B shows a state that an intersection of the crosshatch pattern lies on an end subregion of the pickup region Accd.

The image information for each subregion in the pickup region A is indicated at a logic "0" or "1", where a logic "0" represents a subregion containing no part of the crosshatch pattern and a logic "1" represents a subregion containing a part of the crosshatch pattern.

A subregion indicated at the image information "1" contains a part of the crosshatch pattern. Accordingly, to a subregion "1" is set a spot for measuring a misconvergence (hereinafter referred to as measurement spot). Specifically, a measurement spot for a horizontal misconvergence is set to a subregion containing an image of a vertical line of the crosshatch pattern (hereinafter referred to as vertical line subregion). The vertical line subregion is a subregion "1" in contact with a subregion "0" in a horizontal direction. A measurement spot for a vertical misconvergence is set to a subregion containing an image of a horizontal line of the cross hatch patter (hereinafter referred to as horizontal line subregion). The horizontal line subregion is a subregion "1" which is in contact with a subregion "0" in a vertical direction.

In FIG. 23A, the subregion A(1, 2), A(3, 2) or A(4, 2) is the vertical line subregion while the subregion A(2, 1), A(2, 3) or A(2, 4) is the horizontal line subregion.

In the case of measuring a horizontal misconvergence, one of the subregions A(1, 2), A(3, 2) and A(4, 2) is selected as the vertical line subregion, and a horizontal misconvergence is measured based on the image a signal obtained from the selected the subregion.

In the case of the subregion A(1, 2) being selected as the vertical line subregion, for example, the focusing of the lens assembly 132 is executed based on an image signal from the subregion A(1, 2). The focus control signal generator 149 generates a focus control signal to determine the moving direction of the focusing lens of the lens assembly 132 based on the image signal from the subregion A(1, 2), and transmits the focus control signal to the focus control circuit 134 of the image pickup probe 103.

The focus control circuit 134 drives the focusing lens of the lens assembly 132 at a predetermined speed in an calculated direction in accordance with the focus control signal. Image signals obtained during the focusing operation are sequentially stored in the memory 147. The image signal form the subregion A(1, 2)is transmitted to the focus control signal generator 149. Based on a current image signal from the subregion A(1, 2), the focus control signal generator 149 updates the focus control signal in the so-called hill climbing method and transmits it to the focus control circuit 134 of image pickup probe 103.

Upon the transmission of the focus control signal from the focus control signal generator 149 being stopped, the focusing lens is stopped and the lens assembly 132 is consequently set at the in-focus state to the subregion A(1, 2) of the crosshatch pattern.

Now, a horizontal misconvergence is calculated from the image signal of a vertical line image in the subregion A(1, 2) selected as a misconvergence measurement spot. First, respective luminous gravity centers rDX, gDX and bDS of red, green and blue vertical line images, which together constitute the above-mentioned vertical line, are calculated. Next, a deviation of the luminous gravity centers, e.g., $\Delta dRGX$ ($=rDX-gDX$), or $\Delta dBGX$ ($=bDX-gDX$), is calculated.

Finally, taking into consideration the magnification $\beta$ of the lens assembly 132, a horizontal misconvergence is calculated by converting the above-calculated deviation into a deviation of the luminous gravity center of the display plane of the CRT 111, that is, $\Delta Drgx$ ($=\Delta dRGX/\beta$), or $\Delta Dbgx$ ($=\Delta dBGX/\beta$).

A vertical misconvergence is calculated in a similar manner. If the subregion A(2, 1) is selected as the misconvergence measurement spot, the image pickup probe is focused on an image within the subregion to pick up the image. A vertical misconvergence, e.g., $\Delta Drgy$ ($=\Delta dRGY/\beta$), or $\Delta Dbgy$ ($=\Delta dBGY/\beta$), is calculated from the image signal of the horizontal line in the subregion A(2, 1).

In FIG. 23B, the subregion A(2, 1), A(3, 1) or A(4, 1) is the vertical line subregion while the subregion A(1, 2), A(1, 3) or A(1, 4) is the horizontal line subregion. However, all these subregions are on side end portions of the pickup region Accd. It should be noted that even when a vertical line or horizontal line image is in subregions on the end portion of the pickup region Accd, there is a likelihood that a misconvergence measurement cannot be performed based on the image signal from the subregion on the end portion.

Accordingly, if an intersection of the crosshatch pattern lies on an end subregion A(i, j) of the pickup region Accd, it is determined that the misconvergence measurement cannot be performed. In this case, after the image pickup probe 103 or the cross hatch pattern is shifted so that an intersection of the crosshatch pattern lies on a subregion A(i, j) not located on any end portion of the image pickup region Accd, the misconvergence measurement is again performed.

Specifically, if an intersection of the cross hatch pattern lies on the subregion A(1, 1) shown in FIG. 23B, for example, the crosshatch pattern on the display plane of the CRT 111 is shifted so that the intersection lies on the subregion A(3, 3). The shift control signal generator 150 calculates a shifting amount to send the shift control signal to the pattern generator 102. The pattern generator 102 generates a control signal to shift the display position of the crosshatch pattern on the display plane 111a of the CRT 111 by the shifting amount in a lower right direction. The intersection is thereby shifted to the subregion A(3, 3), providing such possible horizontal line subregion as the subregion A(3, 4) and such possible vertical line subregion as the subregion A(4, 3), and making it possible to measure vertical and horizontal misconvergence based on the image signals from the subregions A(3, 4) and A(4, 3).

FIGS. 24A to 24D shows another representations of images on the cross hatch pattern based on image information.

In FIGS. 24A and 24B, an intersection of the crosshatch pattern does not lie in a subregion on an end portion of the selected pickup region A. In FIG. 24A, as the vertical line subregion can be selected the subregion A(1, 3), A(3, 3) or A(4, 3), while as the horizontal line subregion can be selected the subregion A(2, 1), A(2, 2) or A(2, 4).

In FIGS. 24C and 24D, an intersection of the crosshatch pattern lies in a subregion on an end portion of the pickup region Accd. In these cases, the misconvergence measurement is determined impossible. In the case of FIG. 24C, the crosshatch pattern is shifted a rightward direction by one or two subregions. In the case of FIG. 24D, the crosshatch pattern is shifted in a downward direction by one or two subregions. Consequently, the intersection is apart from the end portions of the pickup region Accd.

Below are described operations of selecting the a vertical line subregion and horizontal line subregion based on the image information with reference to flow charts shown in FIGS. 25 to 27. It should be noted that in these flow charts, the pickup region A is divided into sixteen subregions as shown in FIGS. 23A and 23B, and the crosshatch pattern of which:

1. the pitch is such that no more than one vertical line and no more than one horizontal line occupy the pickup region Accd;

2. the vertical line has such a width as to be smaller than the horizontal length of a subregion A(i, j), and the horizontal line has such a width as to be smaller than the vertical length of a subregion A(i, j); and 3. the vertical line and horizontal line have such a length to entirely traverse the pickup region Accd.

Figure 25:
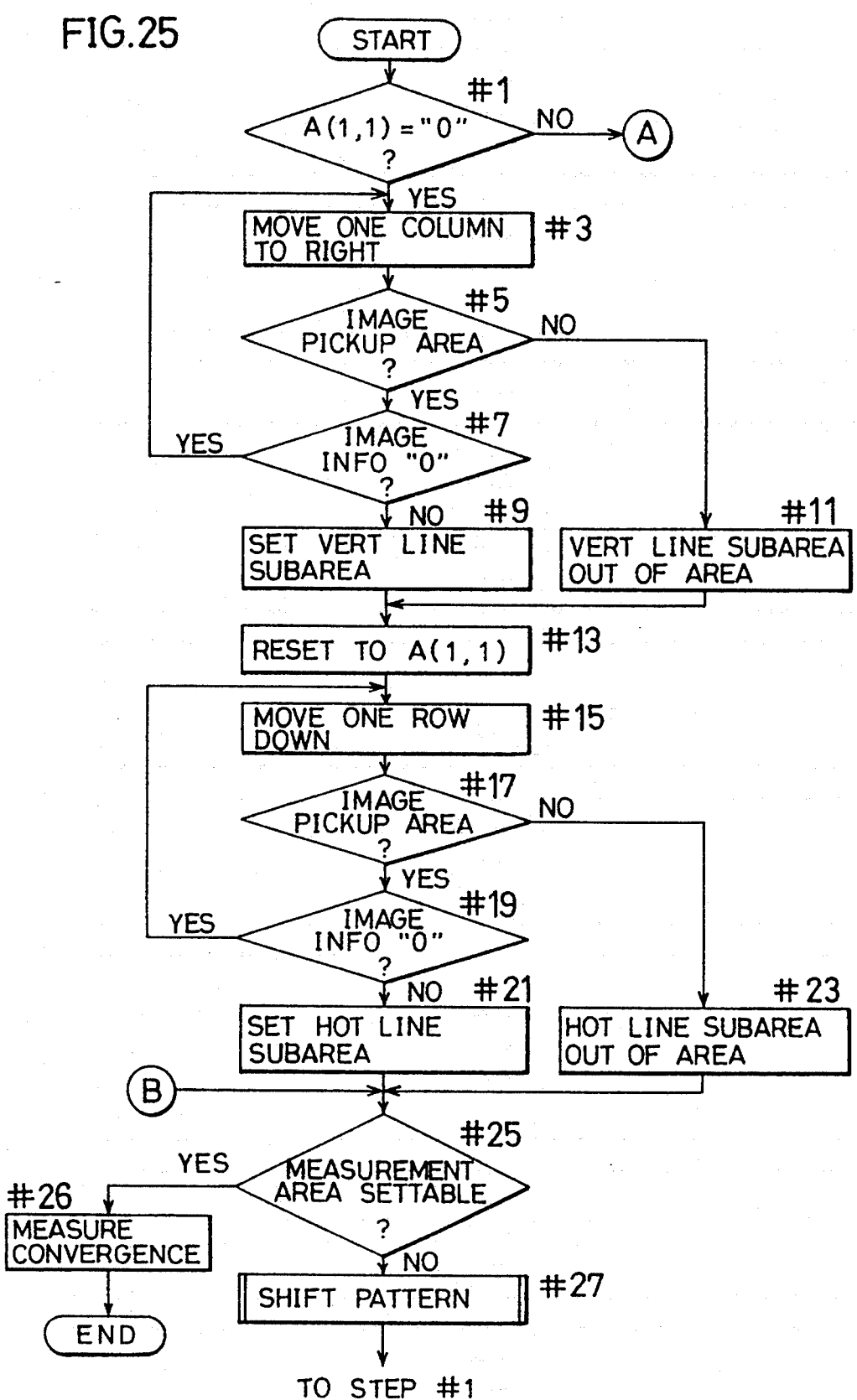
FIGS. 25 and 26 are flowcharts combinedly showing a main routine for measuring a misconvergence.
Figure 26:
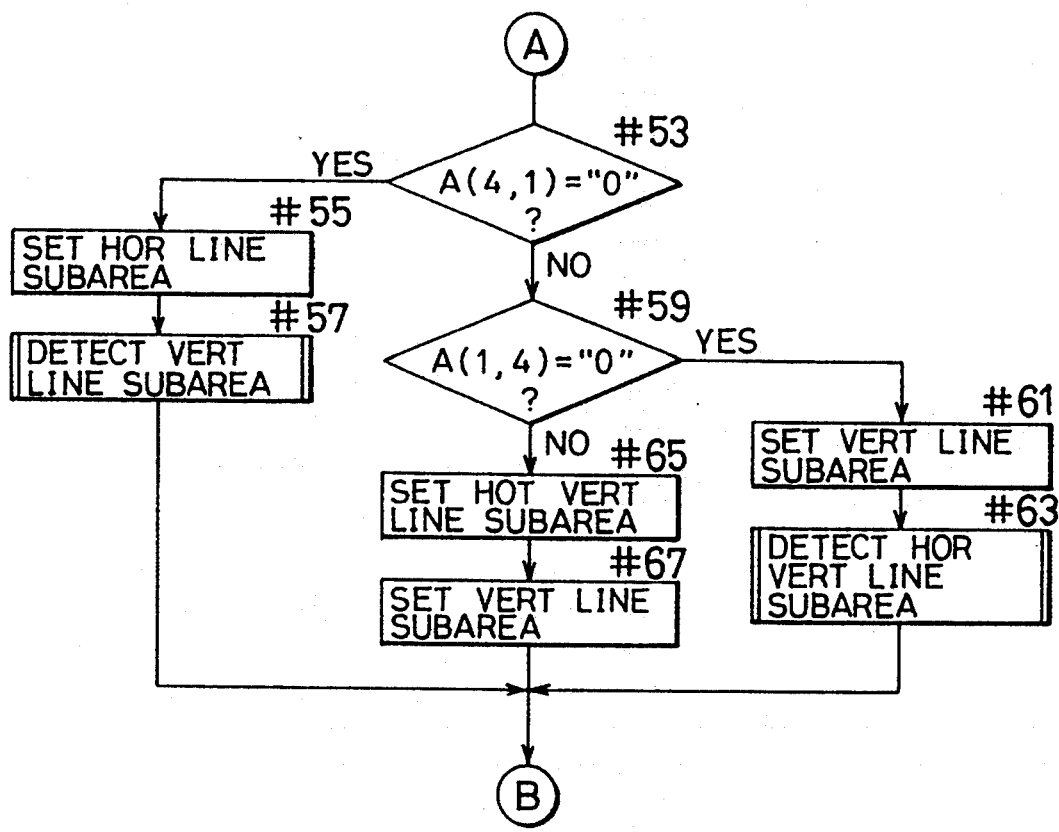
Figure 27:
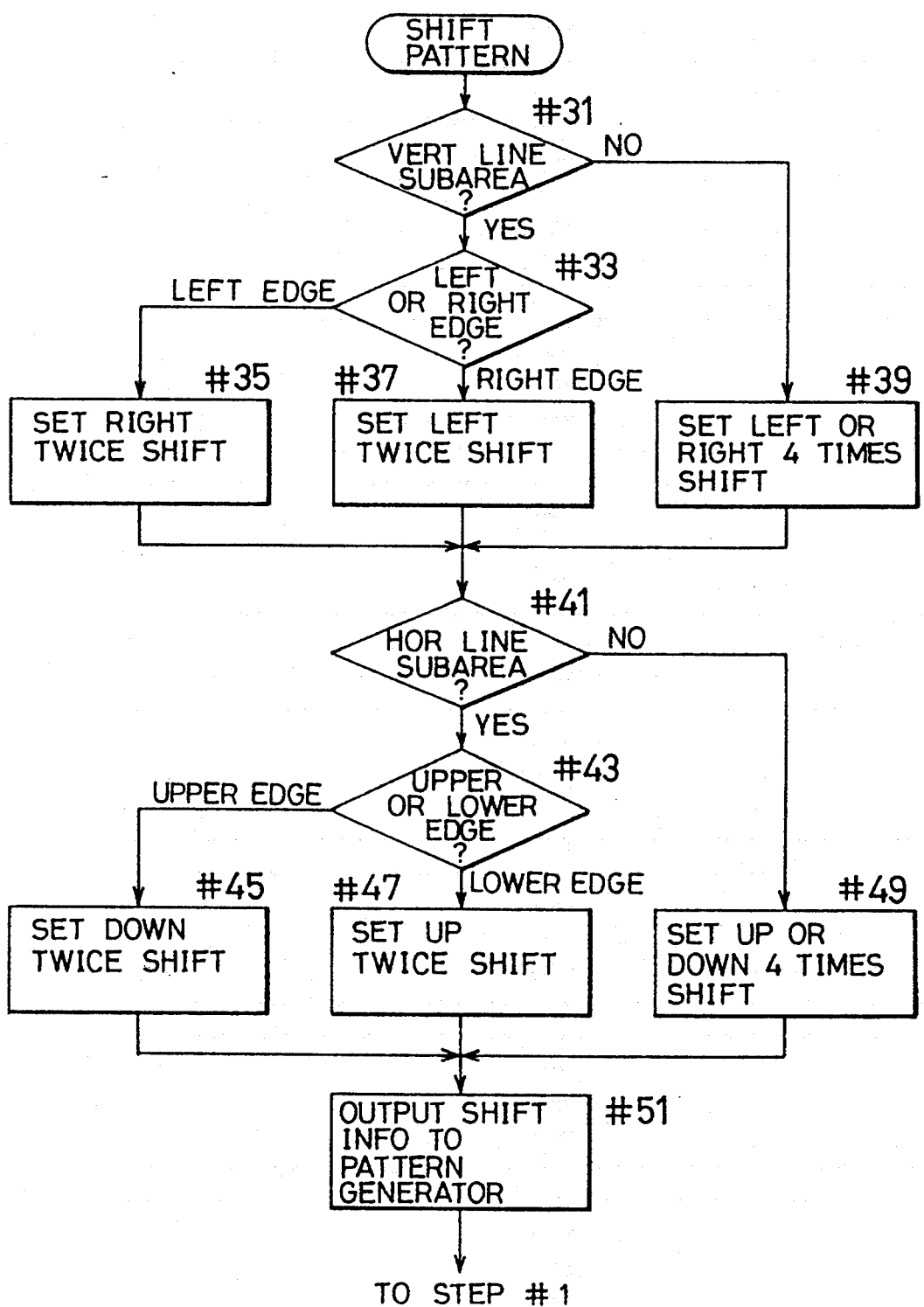
FIG. 27 is a flowchart showing a first subroutine for shifting the crosshatch pattern.

FIGS. 25 to 27 shows a routine of selecting the vertical line subregion and horizontal line subregion based on the image information.

The image information is obtained for each subregion A(i, j) from the image signal of the pickup region Accd, it is discriminated whether the image information of the subregion A(1, 1) at the upper left corner is "0" (Step #1). If the image information of the subregion A(1, 1) is "0", the routine proceeds to Step #3 t find a vertical line subregion. If the image information of the subregion A(1, 1) is "1", the routine proceeds to steps #53 to #67 shown in FIG. 26. Steps #53 to #67 will be described later.

In steps #3 to #11, it is discriminated whether the image information "0" is allotted to the second to fourth subregions A(1, j) (j=2 to 4). The subregions A(1, 2) to A(1, 4) in the first row are checked in this manner to find a subregion containing a vertical line of the crosshatch pattern. If the subregion A(1, j) is discriminated to be allotted with the image information "1" (NO in Step #7), the subregion A((1, j) is selected as the vertical line subregion (Step #9) and the routine proceeds to Step #13.

On the contrary, if the subregion A(1, j) is discriminated not to be allotted with the image information "1", it is judged that a vertical line is not contained in the pickup region Accd (Step #11), and the routine proceeds to Step #13.

Starting now from Step #13, discrimination is carried out in a similar manner of selecting the horizontal line subregion. Specifically, the discrimination is reset to the subregion A(1, 1) in Step #13. In steps #15 to #23, discrimination is executed as to which subregion on the first column is allotted with the image information "1". The discrimination is executed in the order of from the second to fourth subregions A(i, 1) (i=2 to 4). The subregions A(2, 1) to A(4, 1) in the first column are discriminated to find a subregion containing a horizontal line of the crosshatch pattern. If the subregion A(i, 1) is allotted with the image information "1" (NO in Step #19), the subregion A(i, 1) is selected as the horizontal line subregion (Step #21) and the routine proceeds to Step #25.

On the contrary, if the subregion A(i, 1) is discriminated not to be allotted with the image information "1", it is judged that a horizontal line is not contained in the pickup region Accd (Step #23), and the routine proceeds to Step #25.

Next, discrimination is executed as to whether the misconvergence measurement spot can be set at the selected vertical and horizontal subregions (Step #25). It is discriminated that the misconvergence measurement spot cannot be set at these subregions if one of the selected subregions lies on an end portion of the pickup region Accd. Otherwise, it is discriminated that the misconvergence measurement spot can be set at these subregions if one of the selected subregions does not lie on an end portion of the pickup region Accd.

If it is judged that the misconvergence measurement spot can be set at the selected subregions (YES in Step #25), the routine proceeds to Step #26 to execute a misconvergence measurement. Specifically, the performance of the autofocusing is based on the image signal from the selected vertical line subregions. A horizontal misconvergence is calculated based on the image signal of the selected vertical line subregion. Next, the performance of the autofocusing is performed based on the image signal from the selected horizontal line subregion, and a vertical misconvergence is calculated based on the image signal from the selected horizontal line subregion.

If it is discriminated that the misconvergence measurement spot cannot be set at these subregions (NO in Step #25), the routine proceeds to Step #27 to shift the crosshatch pattern on the CRT 111.

FIG. 27 is a flowchart showing a subroutine of shifting the crosshatch pattern on the CRT 111. First, it is discriminated whether a vertical line subregion is in the pickup region Accd (Step #31). If the vertical line subregion is in the pickup region Accd, the subroutine proceeds to Step #33 in which it is discriminated whether the vertical line subregion lies on a left end portion or right end portion of the pickup region Accd.

If the vertical line subregion lies on a left end portion, the shifting amount is set to such an extent as to shift the crosshatch pattern twice as much as the horizontal length of the subregion in a rightward direction (Step #35).

If the vertical line subregion lies on a right end portion of the pickup region Accd, the shifting amount is set to such an extent as to shift the crosshatch pattern twice as much as the horizontal length of the subregion in a leftward direction (Step #37).

If there is not a vertical line subregion in the pickup region Accd, the shifting amount is set to such an extent as to shift the crosshatch pattern four times as much as the horizontal length of the subregion in a leftward or rightward direction (Step #39).

Next, discrimination is executed whether there is a horizontal line subregion in the pickup region Accd (Step #41). If a horizontal line subregion is in the pickup region Accd, the subroutine proceeds to Step #43 in which it is discriminated whether the horizontal line subregion lies on an upper or lower end portion of the pickup region Accd.

If the horizontal line subregion lies on an upper end portion of the pickup device Accd, the shifting amount is set to such an extent as to shift the crosshatch pattern twice as much as the vertical length of the subregion in a downward direction.

If the horizontal line subregion lies on a lower end portion of the pickup region Accd, the shifting amount is set to such an extent as to shift the crosshatch pattern twice as much as the vertical length of the subregion in an upward direction (Step #47).

If there is not a horizontal line subregion in the pickup region Accd, the shifting amount is set to such an extent as to shift the crosshatch pattern four times as much as the vertical length of the subregion in an upward or downward direction (Step #49).

The set shifting amount is sent to the pattern generator 102 (Step #51) and the crosshatch pattern 105 is shifted in the vertical or horizontal direction by the set shifting amount. Thereafter, an image of the shifted crosshatch pattern is picked up again and the obtained image signals are processed in the steps #1 to #51.

When the misconvergence measurement spot is discriminated possible to set at selected subregions (YES in Step #25), the routine proceeds to Step #26 to measure a misconvergence.

Referring again to FIG. 25, if the image information of the subregion A(1, 1) is "1" (NO in Step #1), the routine proceeds to Step #53 in which it is discriminated whether the image information of the subregion A(4, 1) at the lower left corner is "0". If the image information of the subregion A(4, 1) is "0" (YES in Step #53), it is determined that a vertical line of the crosshatch pattern is not contained in the subregions A(i, 1) (i=1 to 4) in the first column. In this case, the subregion A(1, 1) is selected as the horizontal line subregion (Step #55). After executing a procedure similar to steps #3 to #11, the routine proceeds to Step #57 in which the subregions A(4, j) (j=2 to 4) in the fourth row are checked to select a vertical line subregion, and proceeds to Step #25.

If the image information of the subregion A(4, 1) is "1" (NO in Step #53), it is discriminated whether the image information of the subregion A(1, 4) at the upper right corner is "0" (Step #59). If the image information of the subregion A(1, 4) is "0" (YES in Step #59), it is determined that a vertical line of the crosshatch pattern is contained in subregions A(i, 1) (i=1 to 4) in the first column. In this case, the subregion A(1, 1) is selected as the vertical line subregion (Step #61). After executing a procedure similar to steps #15 to #23, the routine proceeds to Step #63 in which the subregions A(i, 4) (i=2 to 4) in the fourth column are checked to select a horizontal line subregion, and proceeds to Step #25.

If the image information of the subregion A(1, 4) is "1" (NO in Step #59), it is determined that the subregion A(1, 1) contains an intersection of the crosshatch pattern, and a vertical line image and a horizontal line image of the crosshatch pattern lie on the subregions A(i, 1) (i=1 to 4) in the first column and the subregions A(1, j) (j=1 to 4) in the first row, respectively. In this case, the subregion A(4, 1) is selected as the vertical line subregion while the subregion A(1, 4) is selected as the horizontal line subregion, for example (steps #65 and #67). Thereafter, the routine proceeds to Step #25.

After executing the operations in steps #53 to #67, it is discriminated in Step #25 that the misconvergence measurement spot cannot be set at either the vertical line subregion or horizontal line subregion that has been selected. This is because either of these subregions lies on an end portion of the pickup region Accd or outside thereof. In this case, the routine proceeds to steps #31 to #51 to shift the crosshatch pattern and set the misconvergence measurement spot.

In this embodiment, the shifting amount of the crosshatch pattern is set in accordance with the vertical and horizontal lengths of a subregion A(i, j) as a reference (steps #35, #37, #39, #45, #47 and #49). However, it may be appropriate to use the line pitch P1 on the horizontal axis and line pitch P2 on the vertical axis of the crosshatch pattern as shown FIG. 19.

Figure 28:
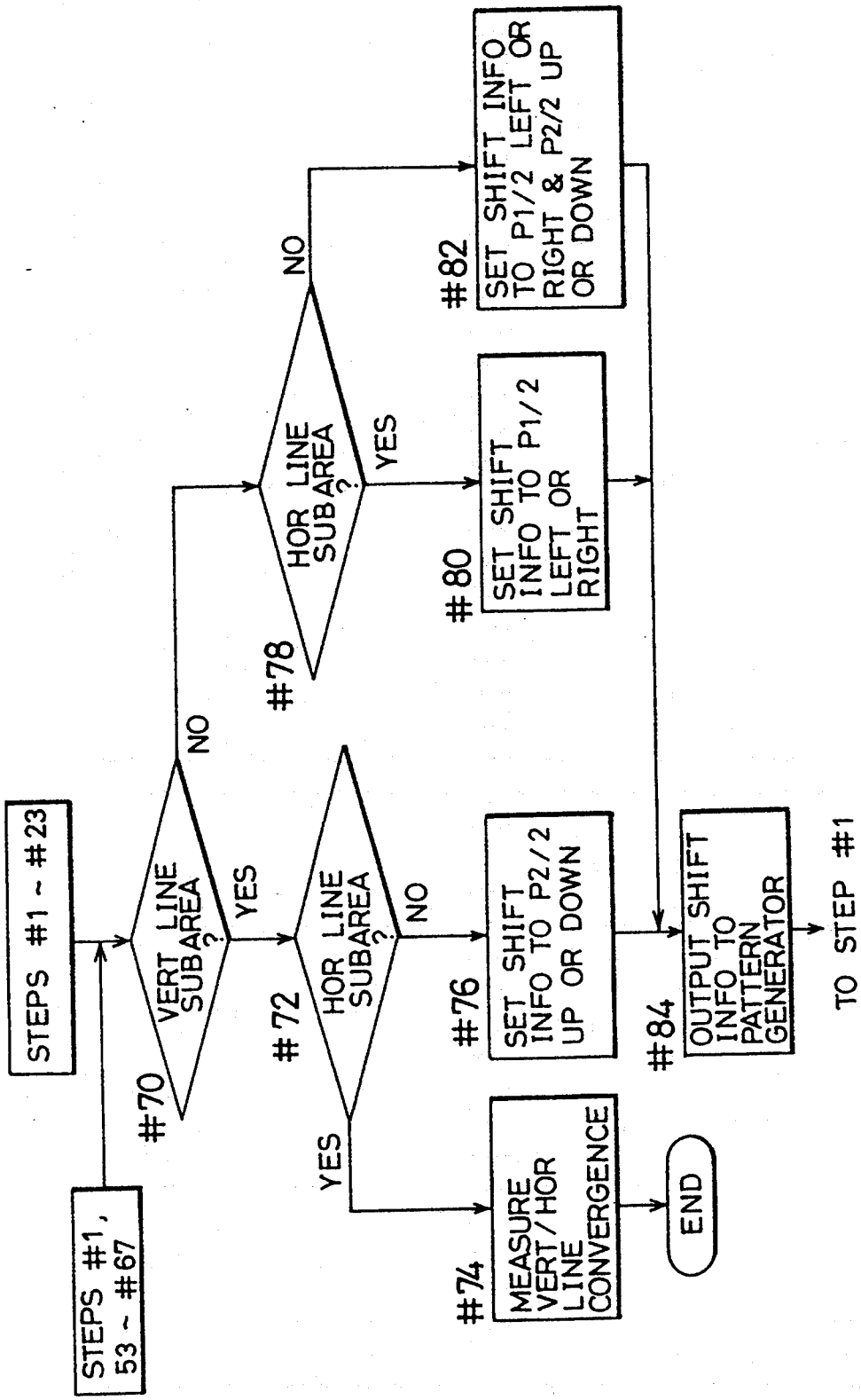
FIG. 28 is a flowchart showing a second subroutine for shifting the crosshatch pattern.

FIG. 28 is a flowchart showing a second subroutine of shifting the crosshatch pattern by using vertical and horizontal line pitches of the crosshatch pattern.

In this subroutine, if a vertical line subregion or a horizontal line subregion is not in the pickup region Accd, the crosshatch pattern is shifted in a horizontal direction by P1/2, or shifted in a vertical direction by P2/2 to bring a vertical line subregion or horizontal line subregion in the pickup region Accd.

In view of the necessity of a high speed processing, in this shifting routine, a vertical line subregion or horizontal line subregion is brought in the pickup region Accd only by one shifting operation. To achieve this, the crosshatch pattern is set at such a pitch as to satisfy the following conditions:

$$P1 \leq (1.5 - 2/j) \times Q1$$

$$P2 \leq (1.5 - 2/i) \times Q2$$

where Q1 denotes the horizontal length of the pickup region, Q2 denotes the vertical length of the pickup region, i denotes the number of vertical divisions of the pickup region, and j denotes the number of horizontal divisions of the pickup region as shown in FIGS. 19 and 20.

In this embodiment, as shown in FIG. 20, the number of vertical divisions is set at 4, and the number of horizontal divisions is similarly set at 4. Accordingly, the following equation is obtained:

$$(1.5 - 2/j) = 1$$

$$(1.5 - 2/i) = 1$$

The mesh pitch of the crosshatch pattern is set so as to satisfy the equations: $P1 \leq Q1$ and $P2 \leq Q2$. If the number i of vertical divisions and the number j of horizontal divisions j are increased so as to have the equations: $(1.5 - 2/j) \approx 1.5$ and $(1.5 - 2/i) \approx 1.5$, the mesh pitch of the crosshatch pattern 105 may be set so as to satisfy the equations: $P1 \leq 1.5 \times Q1$ and $P2 \leq 1.5 \times Q2$.

Referring to FIG. 28, the subroutine proceeds to Step #70 from the main routine. In Step #70, discrimination is executed whether a vertical line subregion is in the pickup region Accd. If a vertical line subregion is in the pickup region Accd (YES in Step #70), it is discriminated in Step #72 whether a horizontal line subregion is in the pickup region Accd. If a horizontal line subregion is in the pickup region Accd (YES in Step #72), Vertical and horizontal misconvergence are measured based on the image signals from the vertical and the horizontal line subregions (Step #74).

If a horizontal line subregion is in the pickup region Accd (NO in Step #72), the shifting amount of the crosshatch pattern is set to such an extent that the crosshatch pattern is shifted by P2/2 in an upward direction or downward direction (Step #76). The shifting amount is sent to the pattern generator 102 (Step #84), and the subroutine returns to Step #1 of the main routine.

The pattern generator 102 delays or advances the phase of the vertical synchronizing signal by an amount corresponding to the shifting amount of P2/2, so that a vertical line subregion and a horizontal line subregion lies in the pickup region Accd in the next measuring cycle. The misconvergence measurement is performed in Step #74.

If a vertical line subregion is not in the pickup region Accd (NO in Step #70), it is discriminated in Step #78 whether a horizontal line subregion is in the pickup region Accd. If a horizontal line subregion is in the pickup region Accd (YES in Step #78), the shifting amount is set to such an extent that the crosshatch pattern is shifted by P1/2 in a leftward or rightward direction (Step #80). If a horizontal line subregion is not in the pickup region Accd (NO in Step #78), the shifting amount is set to such an extent that the crosshatch pattern is shifted by P1/2 in a leftward or rightward direction and by P2/2 in an upward or downward direction (Step #82). The shifting amount is sent to the pattern generator 102 (Step #84), and the subroutine returns to Step #1 of the main routine.

The pattern generator 102 delays or advances the phase of the horizontal synchronizing signal by an amount corresponding to the shifting amount of P1/2. Alternatively, the pattern generator 102 delays or advances the phase of the vertical and horizontal synchronizing signals by amounts corresponding to the shifting amount of P2/2 and P1/2 respectively, that is, $P (= \sqrt{(P1^2 + P2^2)}/2$. Thereby, a vertical line subregion and a horizontal line subregion lie in the pickup region Accd in the next measuring cycle.

In the flow chart of FIG. 28, it may be appropriate to replace the operation in Step #76 with the operation in Step #82 to eliminate steps #80 and #82.

In the flow chart of FIG. 28, also, the crosshatch pattern is shifted by as much as $P (= \sqrt{(P1^2 + P2^2)}/2$ in a lower left direction or upper right direction when neither vertical line subregion nor horizontal line subregion lies in the pickup region Accd, so that both the vertical line subregion and the horizontal line subregion come in the pickup region Accd.

Figure 29:
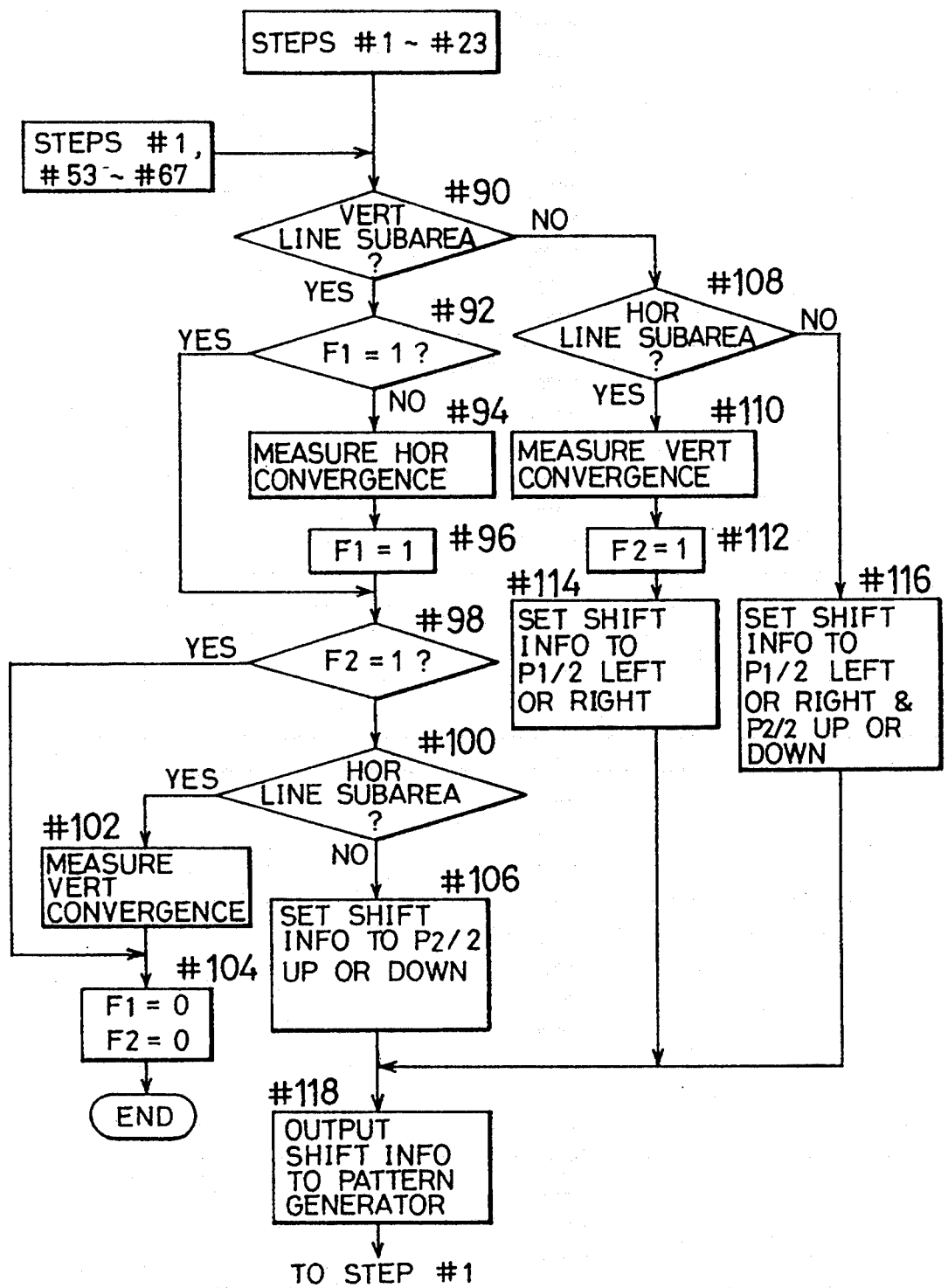
FIG. 29 is a flowchart showing a third subroutine for shifting the crosshatch pattern.

FIG. 29 is a flowchart showing a third subroutine of shifting the crosshatch pattern 105 using vertical and horizontal line pitches of the crosshatch pattern.

In the second shifting subroutine, vertical and horizontal misconvergence measurements are executed after shifting the crosshatch pattern so that a vertical line subregion and a horizontal line subregion come into the pickup region Accd. In the second shifting subroutine, if either a vertical line subregion or a horizontal line subregion lies in the pickup region Accd, a misconvergence measurement is first carried based on the one subregion lying in the pickup region Accd. Thereafter, a second misconvergence measurement is executed based on the other subroutine by shifting the crosshatch pattern so that the other subregion comes into the pickup region Accd.

Referring to FIG. 29, this subroutine proceeds from Step #21, #23, #57, #63 or #67 of the main routine to Step #90 in which it is discriminated whether a vertical line subregion is in the pickup region Accd. If a vertical line subregion is in the pickup region Accd (YES in Step #90), it is discriminated in Step #92 whether flag F1 is set to "1". This flag is indicative of whether the horizontal misconvergence measurement has been executed. When set to "1", the flag F1 indicates that the horizontal misconvergence measurement has already been executed. When set to "0", the flag F1 indicates that the horizontal misconvergence has not been executed.

If the flag F1 is set to "1" (YES in Step #92), the subroutine skips to Step #98. If the flag F1 is set to "0" (NO in Step #92), a horizontal misconvergence measurement is executed using the image signal from the vertical line subregion (Step #94). Subsequently, the flag F1 is set to "1" and the subroutine proceeds to Step #98.

Next, it is discriminated whether a flag F2 is set to "1" (Step #98). This flat is used to check whether the vertical misconvergence measurement has been executed. When set to "1", the flag F2 indicates that the vertical misconvergence measurement has already been executed. When set to "0", on the other hand, the flag F2 indicates that the vertical misconvergence measurement has not been executed.

If the flag F2 is set to "1" (YES in Step #98), it is determined that the misconvergence measurement has already been completed for both the vertical and horizontal directions. In this case, the subroutine proceeds to Step #104 in which the flags F1 and F2 are reset to "0", and thereafter proceeds to Step #1 of the main routine.

If the flag F2 is set to "0" (NO in Step #98), it is discriminated in Step #100 whether a horizontal line subregion is in the pickup region Accd (Step #100). If a horizontal line subregion is in the pickup region Accd (YES in Step #100), a vertical misconvergence measurement is executed using the image signal from the horizontal line subregion (Step #102). After the flags F1 and F2 are reset to "0" (Step #104), the subroutine ends.

If a horizontal line subregion is not in the pickup region Accd (NO in Step #100), the shifting amount is set to such an extent that the crosshatch pattern is shifted by P2/2 in an upward or downward direction (Step #106). After the shifting amount is sent to the pattern generator 102 (Step #118), the subroutine returns to Step #1 of the main routine.

The pattern generator 102 caused the crosshatch pattern to shift by P2/2 in an upward or downward direction, so that a horizontal line subregion comes into the pickup region Accd in a second measuring cycle. The operations of steps #100 to #104 are executed again to measure a vertical misconvergence.

If a vertical line subregion is not in the pickup region Accd (NO in Step #90), it is discriminated in Step #108 whether a horizontal line subregion is in the pickup region Accd. If a horizontal line subregion is in the pickup region Accd (YES in Step #108), a horizontal misconvergence measurement is executed based on the image signal from the horizontal line subregion (Step #110) and the flag F1 is set to "1" (Step #112). Subsequently, the shifting amount is set to such an extent that the crosshatch pattern is shifted by P1/2 in a leftward or rightward direction (Step #114). After the shifting amount is sent to the pattern generator 102 (Step #118), the subroutine returns to Step #1 of the main routine.

The pattern generator 102 caused the crosshatch pattern to shift by P1/2 in a leftward or rightward direction so that a vertical line subregion comes into the pickup region Accd in a second measuring cycle. Thereafter, the operations of steps #90 to #96 are executed again for measurement of a horizontal misconvergence.

If a horizontal line subregion is not in the pickup region Accd (NO in Step #108), the shifting amount is set to such an extent that the crosshatch pattern 105 is shifted by P1/2 in a leftward or rightward direction and by P2/2 in an upward or downward direction (Step #116). The shifting amount is sent to the pattern generator 102 (Step #118) and the subroutine returns to Step #1.

The pattern generator 102 caused the crosshatch pattern to shift by as much as P $(=\sqrt{(P1^2+P2^2)}/2$ in the lower left or upper right direction so that a vertical line subregion and a horizontal line subregion come into the pickup region Accd in the second measuring cycle. The misconvergence measurement is executed in steps #90 to #104 for both vertical and horizontal directions.

Figure 30:
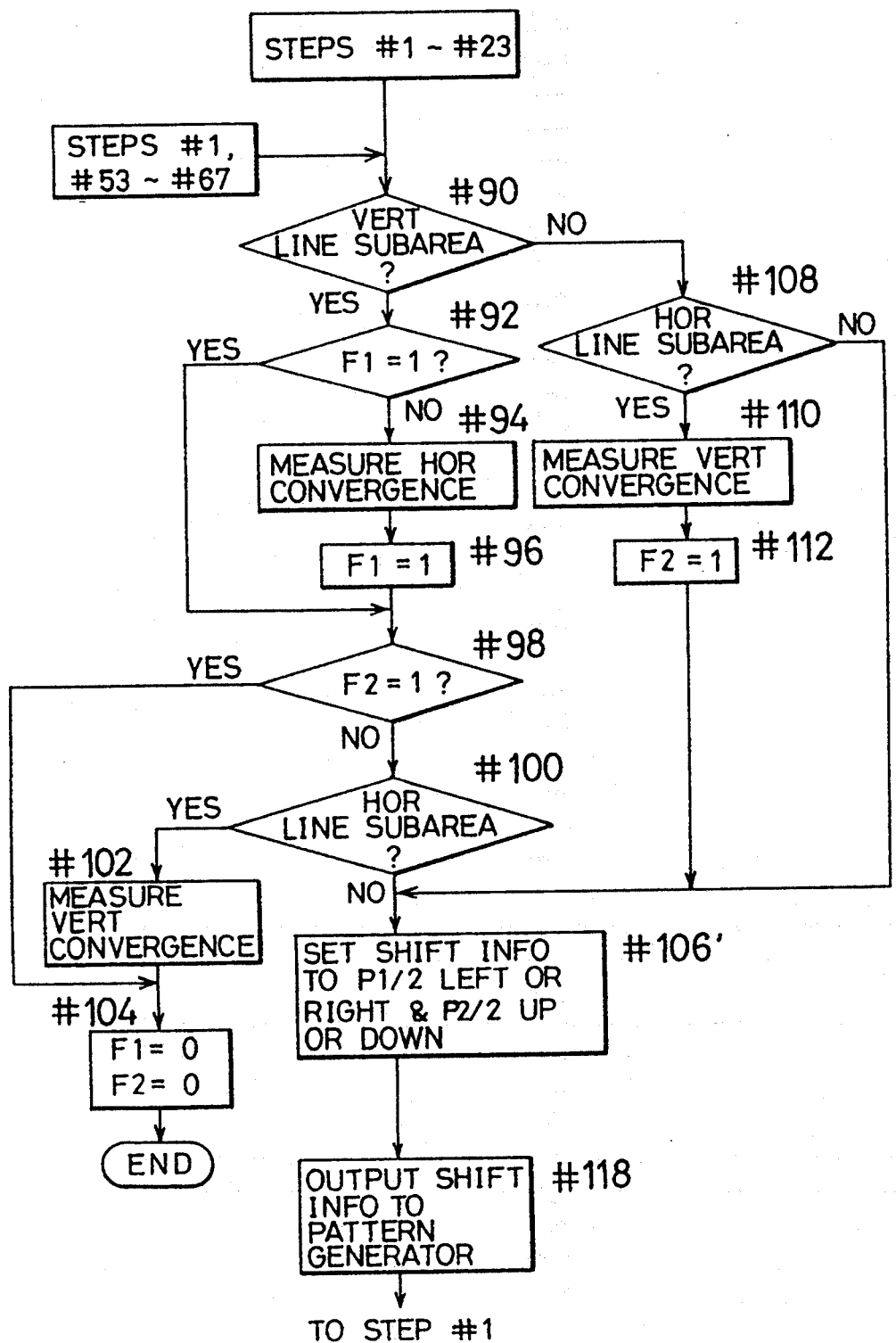
FIG. 30 is a flowchart showing a fourth subroutine for shifting the crosshatch pattern.

FIG. 30 is a flowchart showing a fourth subroutine of shifting the cross hatch pattern by using vertical and horizontal line pitches of the crosshatch pattern. The subroutine of FIG. 30 is basically identical to the subroutine of FIG. 29 except for provision of Step #106' and elimination of steps #114 and #116. Step #106' corresponds to Step #116 of the third subroutine. In the fourth subroutine in FIG. 30, the crosshatch pattern is always shifted as much as P $(=\sqrt{(P1^2+P2^2/2})$ in a lower left or upper right direction so that a vertical line subregion and a horizontal line subregion come into the pickup region Accd.

The shifting amount is, as mentioned above, the fixed extent in the fourth subroutine. The fixed shifting amount can be set in the pattern generator 102 in advance. In Step #106', the measuring main body 104 sends to the pattern generator 102 a control signal indicative of a pattern shift timing. Accordingly, the need for setting a shifting amount for each shifting direction can be eliminated, which thus assure a simplified routine and high speed processing.

In the second and third subroutines, also, it is possible to set in the pattern generator 102 the horizontal shifting amount P1/2 and vertical shifting amount P2/2 in advance to render the pattern generator 102 to merely receive from the measuring main body 104 a control signal indicative of the shifting direction in steps #76, #80, and #82 of the second subroutine, or in steps #106, #114 and #116 of the third subroutine.

In the above-mentioned subroutines, the crosshatch pattern is shifted by a shifting amount which is calculated in accordance with the size of crosshatch pattern image. However, the measuring main body 104 may be made to directly control the pattern generator 102 so as to shift the crosshatch pattern by a desired amount in a desired direction.

Specifically, if a vertical line subregion or a horizontal line subregion is not in the pickup region Accd, the measuring main body 104 is made to send to the pattern generator 102 a control signal requesting a shift in a desired direction. While the crosshatch pattern is being shifted, the measuring main body 104 continues to check whether a vertical line subregion or a horizontal line subregion comes into the pickup region Accd. If both a vertical line subregion and a horizontal line subregion come into the pickup region Accd, it is judged that the misconvergence measurement is possible for the vertical and horizontal directions. The measuring main body 104 sends a "halt" signal to the pattern generator 102 to stop the shifting of the crosshatch pattern 105.

The crosshatch pattern is shifted in accordance with the control signal from the measuring main body 104 so that a vertical line subregion and a horizontal line subregion come into the pickup region Accd. The shifting amount can be minimized, making it possible to realize high-speed processing of misconvergence measurement.

Figure 31:
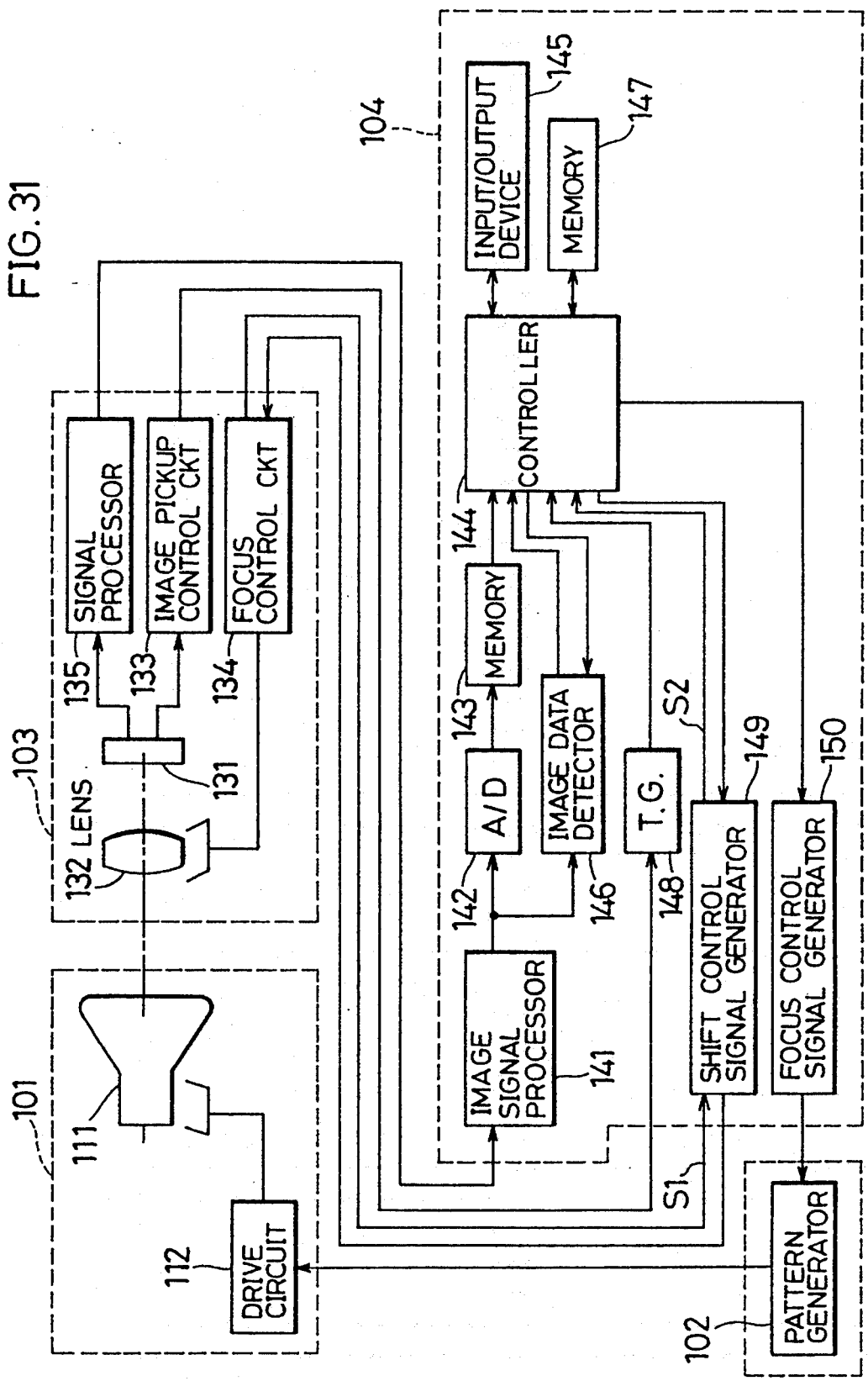
FIG. 31 is a block diagram showing an overall construction of fifth measurement device of the invention.

FIG. 31 is a block diagram showing an overall construction of a fifth measurement device of the invention. The embodiment of FIG. 31 is identical to that of FIG. 15 except for: the former is provided with a signal line Y1 for transmitting position information of a lens assembly 132 from a focus control circuit 134 to a focus control signal generator 149 and a signal line Y2 for transmitting position information for the lens assembly 132 from the focus control signal generator 149 to a controller 144.

In this embodiment, the position of the lens assembly 132 is detected during the autofocusing and the position information is transmitted from the focus control circuit 134 to the focus control signal generator 149. The focus control signal generator 149 calculates the position of the lens assembly 132 based on the position information and transmits the result to the controller 144.

A peak value of the image signal from a subregion A(i, j) on which the lens assembly 132 is being focused by moving a focusing lens in a given direction is then stored in the memory 147. The peak value of the image signal is obtained, while movement of the focusing lens corresponds to a current position of the lens assembly 132. The stored peak values therefore contain information on an in-focus position for a subregion A(i, j) bearing a part of the crosshatch pattern 105.

When a target subregion A(i, j) for misconvergence measurement is selected, the controller 144 determines the in-focus position for the subregion A(i, j) based on the peak values stored in the memory 147 and transmits the information on the in-focus position to the focus control signal generator 149.

The focus control signal generator 149 generates a focus control signal in accordance with the in-focus position information and transmits it to the focus control circuit 134. The focus control circuit 134 moves the focusing lens to the in-focus position according to the focus control signal.

This embodiment provides an advantage over the hill climbing method described earlier in that the focusing can be accomplished quickly by moving the focusing lens to the in-focus position directly.

Also, focusing can be made on a vertical line image and a horizontal line image separately even if the vertical line image and horizontal line image have different in-focus positions because the in-focus position is detected independently for the vertical and horizontal line images. Further, if there is a negligible small difference between the in-focus position for the vertical line image and that for the horizontal line image, it may be appropriate to use an averaged in-focus position as far as to not impair the accuracy of misconvergence measurement, which accordingly provides simplified focusing.

Further, even in the case that an image of the crosshatch pattern lies on an end portion of the pickup region Accd, the curvature of the display plane of the CRT 111 can be calculated using the image signals previously obtained for vertical line image or horizontal line image. Accordingly, the in-focus position of a shifted target image can be calculated based the already obtained image signals and calculated curvature of the display plane of the CRT 111 without actually picking up the shifted target image. This will reduce the focusing speed and thus assures a higher speed misconvergence measurement.

In the above-mentioned embodiments, the crosshatch pattern is shifted to assure the misconvergence measurement spot if an image of the crosshatch pattern lies on a proper position in the pickup region Accd. However, it may be appropriate to reduce the mesh pitch of the crosshatch pattern so small that a crosshatch pattern image always lies on a proper position in the pickup region Accd. This can eliminate the need of shifting the crosshatch pattern.

Figure 32:
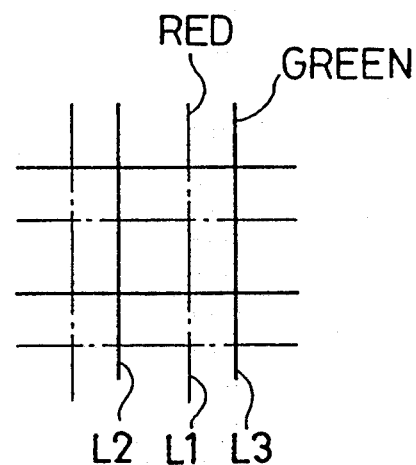
FIG. 32 is a diagram showing a positional relation between green lines and red lines of a fine pitched crosshatch pattern.

In such a fine crosshatch pattern, misconvergences are greater relative to the mesh pitch of the crosshatch pattern. Accordingly, there is a possibility that lines of a crosshatch pattern image should meet one another. For example, in FIG. 32, it is difficult to discriminate which of vertical lines L2 and L3 of green color a vertical line L1 of red color should be met to because of the small mesh pitch. To avoid such difficulty, it may be appropriate to adopt a crosshatch pattern having intersections whose figures are different from one another.

Figure 33:
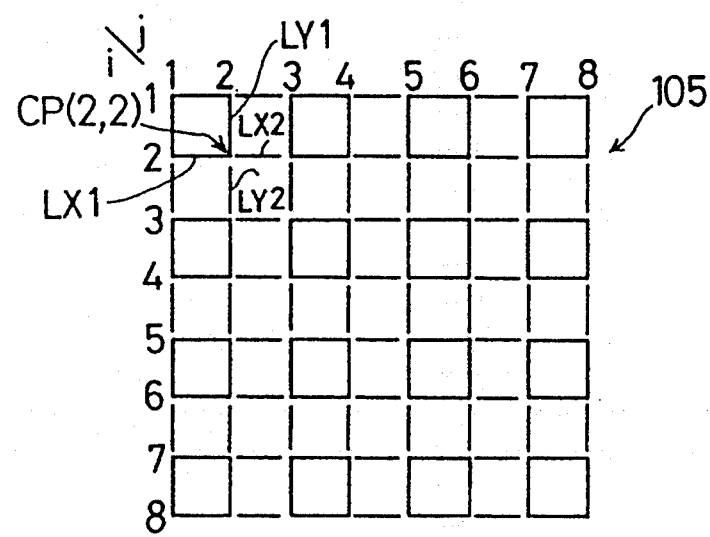
FIG. 33 is a diagram showing a crosshatch pattern having differently-figured intersections.

FIG. 33 shows a crosshatch pattern 105 having intersections figured differently. The crosshatch pattern 105 of FIG. 33 has such intersections, as one of the upper segment and lower segment of each intersection is connected with one of the right segment and the left segment of the intersection; the other vertical segment is disconnected with the other horizontal segment.

More specifically, individual horizontal segments are numbered in order from the top, while individual vertical segments are numbered in order from the left side. An intersection of the i-th horizontal line and the j-th vertical line is expressed by CP(i, j).

Vertical and horizontal segments which are not connected to an intersection CP(i, j) are classified in to the following groups:

1. CP(2k−1, 2k−1): Upper vertical segments and left horizontal segments;
2. CP(2k−1, 2k): Upper vertical segments and right horizontal segments;
3. CP(2k, 2k−1): Lower vertical segments and left horizontal segments; and
4. CP(2k, 2k): Lower vertical segments and right horizontal segments wherein k=1, 2, ... n.

As an example, with the intersection CP (2, 2), the upper vertical segment LY1 and the left horizontal segment LX1 join at the intersection CP (2, 2), while the lower vertical segment LY2 and the right horizontal segment LX2 do not join at the intersection CP(2, 2).

As mentioned above, the crosshatch pattern 105 of FIG. 33 is provided with the intersections whose figures are different at their respective positions. Accordingly, a deviation between the red, green and blue crosshatch images can be accurately detected.

Figure 34:
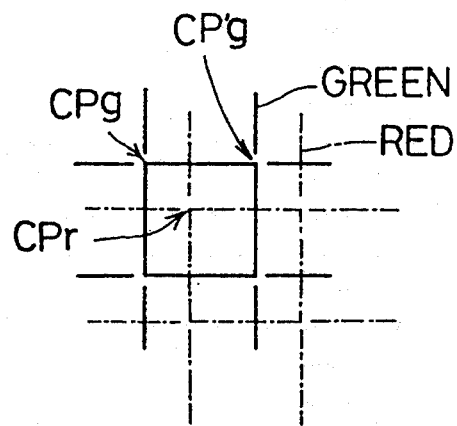
FIG. 34 is a diagram showing a positional relation between green lines and red lines of the crosshatch pattern of FIG. 33.

Specifically, in the case that a green line image and a red line image of the crosshatch pattern 105 deviate from each other as shown in FIG. 34, it is assuredly discriminated that the intersection CPr of the red line image should not be matched with the intersection CPg' of the green line image, but should be matched with the intersection CPg of the green line image. Accordingly, the vertical or horizontal red line image and the horizontal or vertical green line image for misconvergence measurement can be exactly identified.

Also, in the case of using the crosshatch pattern 105 shown in FIG. 33, it is possible to measure a misconvergence with a resolution equal to one pitch of the crosshatch pattern 105 by discriminating the figure of the intersection.

In the crosshatch pattern 105 of FIG. 33, four kinds of intersection are defined by combinations of connection of one of the upper vertical and lower vertical segments and one of the left horizontal and right horizontal segments, and disconnection of the other vertical segment and the other horizontal segment. Alternatively, sixteen kinds of intersection are defined by combinations of connection and disconnection of the upper vertical, lower vertical, right horizontal, and left horizontal segments.

Figure 35:
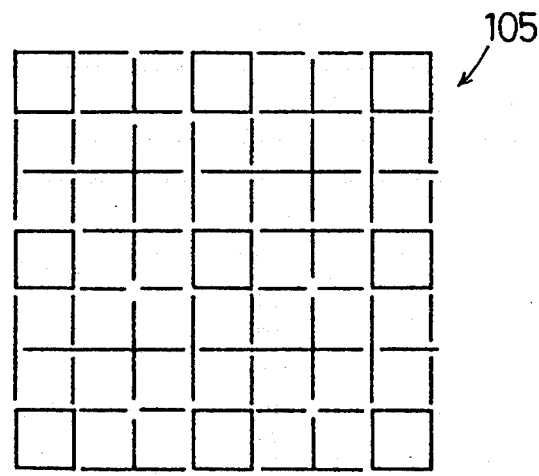
FIG. 35 is a diagram showing another crosshatch pattern having differently-figured intersections.

FIG. 35 shows another crosshatch pattern formed by a more complicated combinations of ten kinds of intersection selected from the sixteen kinds of intersection. It could be understood from FIG. 35 that the recurrence of the same figured intersections decreases with increase in the number of different figures. Accordingly, an increase in the number of different figures improves the discrimination of intersection, assuring an accurate misconvergence measurement even for a greater misconvergence.

In the above-mentioned embodiments, the crosshatch pattern is shifted to place the measurement spot in the pickup region. Instead, it may be possible to move the image pickup probe 103 relative to the crosshatch pattern on the display plane of the CRT 111 to place the measurement spot in the pickup region. For example, it may be appropriate to attach the image pickup probe 103 on a supporting block which is mounted on a frame, positioned in front of the CRT 111 and translatable over the display plane in vertical and horizontals. The supporting block is moved in accordance with a control signal representing a moving amount equivalent of the shifting amount.

In the foregoing embodiments, the present invention has been described with reference to a measurement for convergence adjustment of a color CRT. However, it should be noted that the present invention is applicable to other measurements than just for convergence adjustment. For example, a measurement for purity adjustment of adjusting the direction of each electron beam of a color CRT so as to strike the corresponding phosphor dot after a shadow mask, a measurement for adjustment of width of each electron beam of a color CRT.

What is claimed is:

1. A device for measuring a characteristic of a color CRT having a display surface and a pickup region on the display surface, the device comprising:
    image pickup means for receiving a light image from the pickup region to produce an electrical image signal, the pickup region having a specified area and consisting of a plurality of subregions for measurement;
    an optical system having a focusing lens which provides a focused light image from the color CRT to the image pickup means;
    divider means for dividing the electrical image signal into a plurality of image signal portions corresponding to the plurality of subregions;
    selector means for selecting an image signal portion corresponding to a particular subregion;
    controller means for controlling the focusing lens based on the selected image signal portion to focus on the particular subregion; and
    calculator means for calculating a characteristic of the color CRT based on the selected image signal portion produced when the focusing lens is focused on the particular subregion.

2. A device as defined in claim 1, wherein the calculator means includes calculating means for calculating a misconvergence of the color CRT.

3. A device as defined in claim 1, wherein the light image is a measurement image having a predetermined pattern figure.

4. A device as defined in claim 3, wherein the measurement image is a crosshatch pattern.

5. A device as defined in claim 1, wherein the image pickup means includes a two-dimensional area sensor.

6. A device as defined in claim 1, wherein the controller includes:
    sharpness detector means for detecting a sharpness of a received image based on the electrical image signal each time the focusing lens is moved;
    focal position detector means for detecting a focal position of the focusing lens in order to provide a sharp light image; and
    driver means for driving the focusing lens to move to the detected focal position.

7. A device as defined in claim 1 further comprising:
    light image producing means for producing a light image on the display surface of the color CRT in accordance with a vertical synchronizing signal; and
    image pickup controller means responsive to the vertical synchronizing signal for controlling the image pickup means to pick up a light image in synchronism with the vertical synchronizing signal.

8. A device for measuring a characteristic of a color CRT having a display surface and a pickup region on the display surface, the device comprising:
    a photoelectric sensor which receives a light image from the pickup region to produce an electrical image signal, the pickup region having a specified area and consisting of a plurality of subregions for measurement;
    an optical system having a focusing lens which provides a focused light image from the color CRT to the photoelectric sensor;
    a divider which divides the electrical image signal into a plurality of image signal portions corresponding to the plurality of subregions;
    a selector which selects an image signal portion corresponding to a particular subregion;
    a controller which controls the focusing lens based on the selected image signal portion to focus on the particular subregion; and
    a calculator means which calculates a characteristic of the color CRT based on the selected image signal portion produced when the focusing lens is focused on the particular subregion.

9. A device as defined in claim 8, wherein the calculator calculates a misconvergence of the color CRT.

10. A device as defined in claim 8, wherein the light image is a measurement image having a predetermined pattern figure.

11. A device as defined in claim 10, wherein the measurement image is a crosshatch pattern.

12. A device as defined in claim 8, wherein the photoelectric sensor includes a two-dimensional area sensor.

13. A device as defined in claim 8, wherein the controller includes:
    a sharpness detector means which detects a sharpness of a received image based on the electrical image signal each time the focusing lens is moved;
    a focal position detector which detects a focal position of the focusing lens in order to provide a sharp light image; and
    a lens driver which drives the focusing lens to move to the detected focal position.

14. A device as defined in claim 8, further comprising:
    a light image producer which produces a light image on the display surface of the color CRT in accordance with a vertical synchronizing signal; and
    an image pickup controller which controls the photoelectric electrical sensor for picking up a light image in synchronism with the vertical synchronizing signal, the image pickup controller being responsive to the vertical synchronizing signal.

* * * * *